US012665657B2

(12) United States Patent
Ma et al.

(10) Patent No.: US 12,665,657 B2
(45) Date of Patent: Jun. 23, 2026

(54) POLARIZATION INDICATIONS FOR SYNCHRONIZATION SIGNAL BLOCK, CORESET, AND BEAM FOOTPRINT

(71) Applicant: QUALCOMM Incorporated, San Diego, CA (US)

(72) Inventors: Liangping Ma, San Diego, CA (US); Xiao Feng Wang, San Diego, CA (US); Peter Gaal, San Diego, CA (US); Alberto Rico Alvarino, San Diego, CA (US); Ayan Sengupta, San Diego, CA (US); Lizhi Zheng, San Diego, CA (US); Bharat Shrestha, San Diego, CA (US); Jun Ma, San Diego, CA (US); Umesh Phuyal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 420 days.

(21) Appl. No.: 17/447,117

(22) Filed: Sep. 8, 2021

(65) Prior Publication Data

US 2022/0109490 A1     Apr. 7, 2022

Related U.S. Application Data

(60) Provisional application No. 63/198,213, filed on Oct. 2, 2020.

(51) Int. Cl.
*H04W 72/00*     (2023.01)
*H04B 7/10*      (2017.01)
(Continued)

(52) U.S. Cl.
CPC .............. *H04B 7/10* (2013.01); *H04W 48/16* (2013.01); *H04W 72/046* (2013.01); *H04W 72/20* (2023.01)

(58) Field of Classification Search
None
See application file for complete search history.

(56) References Cited

U.S. PATENT DOCUMENTS

| | | | |
|---|---|---|---|
| 11,509,364 B2 | 11/2022 | Chakraborty et al. | |
| 2019/0150068 A1* | 5/2019 | Montojo | H04L 5/0046 370/329 |

(Continued)

FOREIGN PATENT DOCUMENTS

| | | |
|---|---|---|
| CN | 110224802 A | 9/2019 |
| WO | 2018169635 | 9/2018 |
| WO | 2020032724 A1 | 2/2020 |

OTHER PUBLICATIONS

Panasonic: Discussion on beam management and polarization for NTN; 3GPP Draft; R1-1912902; 3GPP TSG RAN WG1 #99; Reno, USA, Nov. 18-22, 2019, XPO5 1820237 (Year: 2019).*

(Continued)

*Primary Examiner* — Jeffrey M Rutkowski
*Assistant Examiner* — Mehedi S Aley
(74) *Attorney, Agent, or Firm* — Harrity & Harrity, LLP

(57)     ABSTRACT
Various aspects of the present disclosure generally relate to wireless communication. In some aspects, a user equipment (UE) may receive an indication of a polarization of at least one synchronization signal block (SSB). The UE may determine a polarization of another beam based at least in part on the indicated polarization. Numerous other aspects are provided.

30 Claims, 20 Drawing Sheets

1100 ——►

1110 — Receive an indication of a polarization of at least one synchronization signal block (SSB)

1120 — Determine a polarization of another beam based at least in part on the indicated polarization

(51) Int. Cl.

| | |
|---|---|
| *H04W 48/00* | (2009.01) |
| *H04W 48/16* | (2009.01) |
| *H04W 72/044* | (2023.01) |
| *H04W 72/20* | (2023.01) |

(56) References Cited

U.S. PATENT DOCUMENTS

| | | | |
|---|---|---|---|
| 2021/0007072 A1* | 1/2021 | Wu | H04L 5/0053 |
| 2021/0368456 A1* | 11/2021 | Nilsson | H04B 7/0617 |
| 2022/0225432 A1* | 7/2022 | Wang | H04B 7/18513 |
| 2022/0352971 A1* | 11/2022 | Liberg | H04B 7/18519 |
| 2022/0393754 A1* | 12/2022 | Cao | H04L 5/0053 |
| 2022/0407546 A1* | 12/2022 | Nishio | H04W 72/23 |
| 2023/0284277 A1* | 9/2023 | Park | H04W 74/006 |
| | | | 370/329 |

OTHER PUBLICATIONS

MediaTek Inc: "Summary of 8.4.4 Other Aspects of NR-NTN", 3GPP Draft; R1-2007060; 3GPP TSG RAN WG1 Meeting #102e; e-Meeting Aug. 17-28, 2020; XP051921231 (Year: 2020).*

Mediatek Inc: "Summary of 8.4.4 Other Aspects of NR-NTN", 3GPP TSG RAN WG1 Meeting #102e, 3GPP Draft, R1-2007060, 3rd Generation Partnership Project (3GPP), Mobile Competence Centre, 650, Route Des Lucioles, F-06921 Sophia-Antipolis Cedex, France, No. e-Meeting, Aug. 17, 2020-Aug. 28, 2020, Aug. 22, 2020 (Aug. 22, 2020), 42 Pages, XP051921231, Retrieved from the Internet: URL: https://www.3gpp.org/ftp/TSG_RAN/WG1_RL1/ TSGR1_102-e/Docs/R1-2007060.zip, [retrieved on Aug. 22, 2020], Section 4.1 and Sections 4.2.1-4.2.2.

Panasonic: "Discussion on Beam Management and Polarization for NTN", 3GPP TSG RAN WG1 #99, R1-1912902, 3rd Generation Partnership Project (3GPP), Mobile Competence Centre, 650, Route Des Lucioles, F-06921 Sophia-Antipolis Cedex, France, vol. RAN WG1, No. Reno, USA, Nov. 18-22, 2019, Nov. 8, 2019 (Nov. 8, 2019), 3 Pages, XP051820237, Retrieved from the Internet: URL: https://ftp.3gpp.org/tsg_ran/WG1_RL1/TSGR1_99/Docs/R1-1912902. zip, R1-1912902 NTN BM and Polarization.docx [Retrieved on Nov. 8, 2019], Section 2 and Section 3, The whole document.

Partial International Search Report—PCT/US2021/071407—ISA/ EPO—Dec. 22, 2021.

International Search Report and Written Opinion—PCT/US2021/ 071407—ISA/EPO—Feb. 21, 2022.

\* cited by examiner

500

A coverage area is served by one polarization

502

A coverage area served by two polarizations of same or different frequency

630
Determine polarization of synchronization signal block (SSB)

NTN entity 610

635
Transmit configuration information indicating polarization of SSB

640
Transmit SSB with indicated polarization

645
Determine polarization of another beam based at least in part on SSB and indicated polarization

UE 620

600

1000

NTN entity 1010

1030
Transmit beam footprint information

UE 1020

1035
Determine respective polarization
for each beam footprint

1040
Communicate in beam footprint
using the respective polarization

Receive an indication of a polarization of at least one synchronization signal block (SSB)

1110

Determine a polarization of another beam based at least in part on the indicated polarization

1120

1100

1200

1210 Transmit an indication of a polarization of at least one SSB

1220 Transmit the SSB with the indicated polarization in a beam

Receive an indication of a polarization of a control resource set zero (CORESET#0) in one of a medium access control control element, a radio resource control message, or a master information block

1310

Configure one or more antennas for receiving the CORESET#0 based at least in part on the indicated polarization

1320

1300

1410 Receive beam footprint information for each of one or more beam footprints

1420 Determine a respective polarization for each of the one or more beam footprints 1430 Communicate in a beam footprint of the one or more beam footprints using the respective polarization determined for the beam footprint

1400

1510 Transmit beam footprint information for each of one or more beam footprints, the beam footprint information indicating a respective polarization for each of the one or more beam footprints 1520 Communicate in a beam footprint of the one or more beam footprints using the respective polarization for the beam footprint

1500

POLARIZATION INDICATIONS FOR SYNCHRONIZATION SIGNAL BLOCK, CORESET, AND BEAM FOOTPRINT

CROSS-REFERENCE TO RELATED APPLICATION

This patent application claims priority to U.S. Provisional Patent Application No. 63/198,213, filed on Oct. 2, 2020, entitled "POLARIZATION INDICATIONS FOR SYN-CHRONIZATION SIGNAL BLOCK, CORESET, AND BEAM FOOTPRINT," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for polarization indications for a synchronization signal block, a controlled resource set, or a beam footprint.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" or "forward link" refers to the communication link from the BS to the UE, and "uplink" or "reverse link" refers to the communication link from the UE to the BS. As will be described in more detail herein, a BS may be referred to as a Node B, a gNB, an access point (AP), a radio head, a transmit receive point (TRP), a New Radio (NR) BS, or a 5G Node B.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE, NR, and other radio access technologies.

SUMMARY

In some aspects, a user equipment (UE) for wireless communication includes a memory and one or more processors coupled to the memory, the one or more processors configured to receive an indication of a polarization of at least one synchronization signal block (SSB) and determine a polarization of another beam based at least in part on the indicated polarization.

In some aspects, a non-terrestrial network entity for wireless communication includes a memory and one or more processors coupled to the memory, the one or more processors configured to transmit an indication of a polarization of at least one SSB and transmit the SSB with the indicated polarization in a beam.

In some aspects, a UE for wireless communication includes a memory and one or more processors coupled to the memory, the one or more processors configured to receive beam footprint information for each of one or more beam footprints, determine a respective polarization for each of the one or more beam footprints, and communicate in a beam footprint of the one or more beam footprints using the respective polarization determined for the beam footprint.

In some aspects, a UE for wireless communication includes a memory and one or more processors coupled to the memory, the one or more processors configured to receive an indication of a polarization of a control set zero (CORESET #0) in one of a medium access control control element (MAC CE), a radio resource control (RRC) message, or a master information block (MIB); and configure one or more antennas for receiving the CORESET #0 based at least in part on the indicated polarization.

In some aspects, a non-terrestrial network (NTN) entity for wireless communication includes a memory and one or more processors coupled to the memory, the one or more processors configured to transmit beam footprint information for each of one or more beam footprints, the beam footprint information indicating a respective polarization for each of the one or more beam footprints, and communicate in a beam footprint of the one or more beam footprints using the respective polarization for the beam footprint.

In some aspects, a method of wireless communication by a UE includes receiving an indication of a polarization of at least one SSB and determining a polarization of another beam based at least in part on the indicated polarization.

In some aspects, a method of wireless communication by a non-terrestrial network entity includes transmitting an indication of a polarization of at least one SSB and transmitting the SSB with the indicated polarization in a beam.

In some aspects, a method of wireless communication by a UE includes receiving an indication of a polarization of a CORESET #0 in one of a MAC CE, an RRC message, or an MIB; and configuring one or more antennas for receiving the CORESET #0 based at least in part on the indicated polarization.

In some aspects, a method of wireless communication by a UE includes receiving beam footprint information for each of one or more beam footprints, determining a respective polarization for each of the one or more beam footprints, and communicating in a beam footprint of the one or more beam footprints using the respective polarization determined for the beam footprint.

In some aspects, a method of wireless communication by an NTN entity includes transmitting beam footprint information for each of one or more beam footprints, the beam footprint information indicating a respective polarization for each of the one or more beam footprints, and communicating in a beam footprint of the one or more beam footprints using the respective polarization for the beam footprint.

In some aspects, a non-transitory computer-readable medium storing a set of instructions for wireless communication includes one or more instructions that, when executed by one or more processors of a UE, cause the UE to receive an indication of a polarization of at least one SSB and determine a polarization of another beam based at least in part on the indicated polarization.

In some aspects, a non-transitory computer-readable medium storing a set of instructions for wireless communication includes one or more instructions that, when executed by one or more processors of a non-terrestrial network entity, cause the non-terrestrial network entity to transmit an indication of a polarization of at least one SSB and transmit the SSB with the indicated polarization in a beam.

In some aspects, a non-transitory computer-readable medium storing a set of instructions for wireless communication includes one or more instructions that, when executed by one or more processors of a UE, cause the UE to receive an indication of a polarization of a CORESET #0 in one of a MAC CE, an RRC message, or an MIB; and configure one or more antennas for receiving the CORESET #0 based at least in part on the indicated polarization.

In some aspects, a non-transitory computer-readable medium storing a set of instructions for wireless communication includes one or more instructions that, when executed by one or more processors of a UE, cause the UE to receive beam footprint information for each of one or more beam footprints, determine a respective polarization for each of the one or more beam footprints, and communicate in a beam footprint of the one or more beam footprints using the respective polarization determined for the beam footprint.

In some aspects, a non-transitory computer-readable medium storing a set of instructions for wireless communication includes one or more instructions that, when executed by one or more processors of an NTN entity, cause the NTN entity to transmit beam footprint information for each of one or more beam footprints, the beam footprint information indicating a respective polarization for each of the one or more beam footprints, and communicate in a beam footprint of the one or more beam footprints using the respective polarization for the beam footprint.

In some aspects, an apparatus for wireless communication includes means for receiving an indication of a polarization of at least one SSB and means for determining a polarization of another beam based at least in part on the indicated polarization.

In some aspects, an apparatus for wireless communication includes means for transmitting an indication of a polarization of at least one SSB and means for transmitting the SSB with the indicated polarization in a beam.

In some aspects, an apparatus for wireless communication includes means for receiving an indication of a polarization of a CORESET #0 in one a MAC CE, an RRC message, or an MIB; and means for configuring one or more antennas for receiving the CORESET #0 based at least in part on the indicated polarization.

In some aspects, an apparatus for wireless communication includes means for receiving beam footprint information for each of one or more beam footprints, means for determining a respective polarization for each of the one or more beam footprints, and means for communicating in a beam footprint of the one or more beam footprints using the respective polarization determined for the beam footprint.

In some aspects, an apparatus for wireless communication includes means for transmitting beam footprint information for each of one or more beam footprints, the beam footprint information indicating a respective polarization for each of the one or more beam footprints, and means for communicating in a beam footprint of the one or more beam footprints using the respective polarization for the beam footprint.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
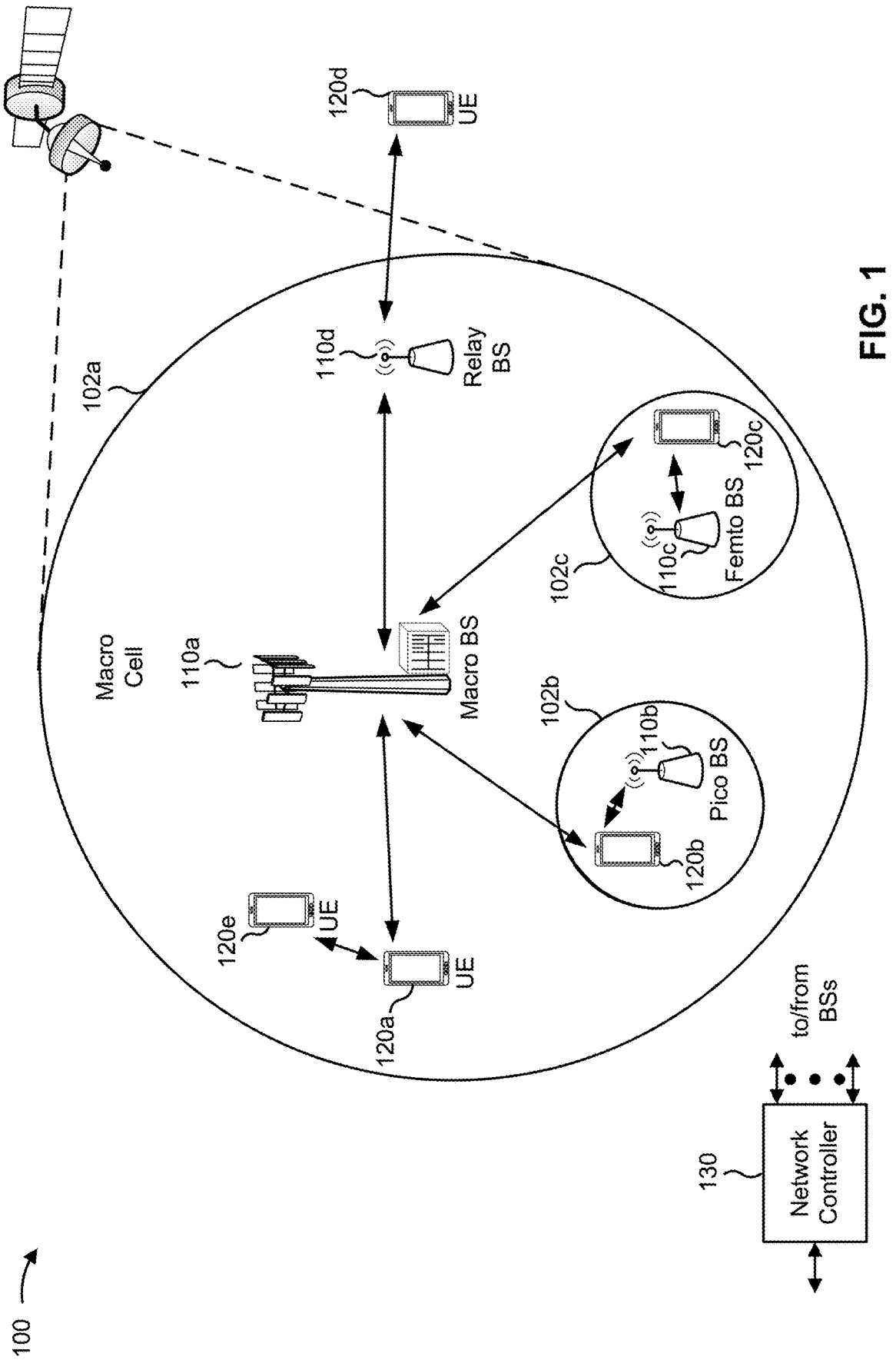
FIG. 1 is a diagram illustrating an example of a wireless network, in accordance with the present disclosure.

FIG. 1 is a diagram illustrating an example of a wireless network 100 in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, or a transmit receive point (TRP). Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, or a virtual network using any suitable transport network.

In some aspects, as shown, a cell may be provided by a base station 110 of a non-terrestrial network. As used herein, "non-terrestrial network" may refer to a network for which access is provided by a non-terrestrial base station, such as a base station carried by a satellite, a balloon, a dirigible, an airplane, an unmanned aerial vehicle, a high altitude platform station, and/or the like.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, and/or the like. In some aspects, a relay station may be implemented using a non-terrestrial platform, similarly to the base station described above.

Wireless network 100 may be a heterogeneous network that includes BSs of different types, such as macro BSs, pico BSs, femto BSs, and/or relay BSs. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120_a_, 120_b_, 120_c_) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, and/or an air interface. A frequency may also be referred to as a carrier, and/or a frequency channel. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120_a_ and UE 120_e_) may communicate directly using one or more sidelink channels (e.g., without using a base station

110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
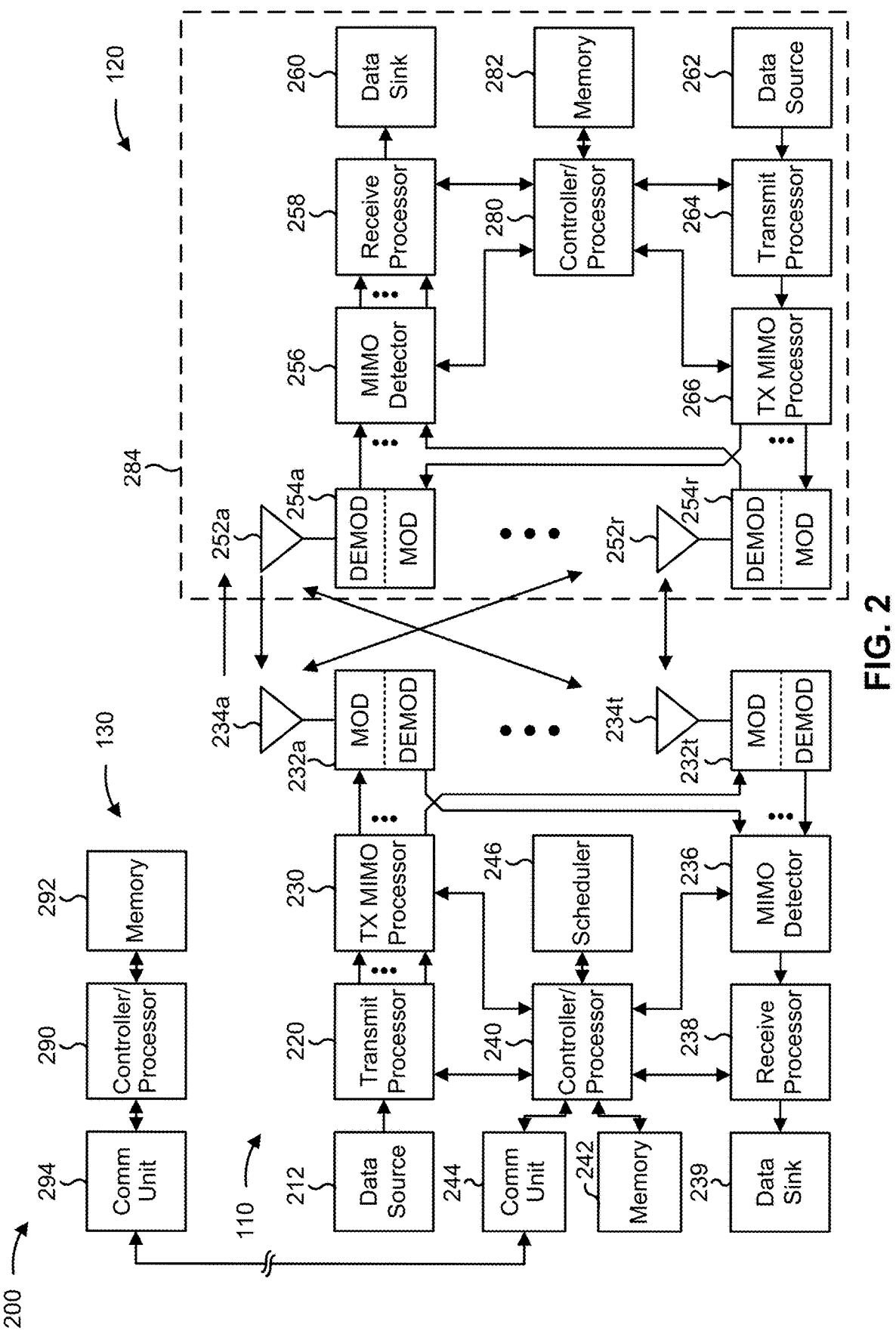
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234_a_ through 234_t_, and UE 120 may be equipped with R antennas 252_a_ through 252_r_, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, upper layer signaling) and provide overhead symbols and control symbols. Transmit processor 220 may also generate reference symbols for reference signals (e.g., a cell-specific reference signal (CRS), a demodulation reference signal (DMRS)) and synchronization signals (e.g., the primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine reference signal received power (RSRP), received signal strength indicator (RSSI), reference signal received quality (RSRQ), and/or CQI, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 5-20).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 5-20).

Controller/processor 240 of base station 110, controller/processor 280 of UE 120, and/or any other component(s) of FIG. 2 may perform one or more techniques associated with polarization indications for a synchronization signal block (SSB), a controlled resource set (CORESET), or a beam footprint, as described in more detail elsewhere herein. For example, a controller/processor of a non-terrestrial network (NTN) entity (e.g., controller/processor 240 of base station 110), controller/processor 280 of UE 120, and/or any other component(s) of FIG. 2 may perform or direct operations of, for example, process 1100 of FIG. 11, process 1200 of FIG. 12, process 1300 of FIG. 13, process 1400 of FIG. 14, process 1500 of FIG. 15, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of base station 110 and/or UE 120, may cause the one or more processors, UE 120, an NTN entity, and/or base station 110 to perform or direct operations of, for example, process 1100 of FIG. 11, process 1200 of FIG. 12, process 1300 of FIG. 13, process 1400 of FIG. 14, process 1500 of FIG. 15, and/or other processes as described herein. In some aspects, executing instructions may include running the instructions, converting the instructions, compiling the instructions, and/or interpreting the instructions, among other examples.

In some aspects, a UE 120 includes means for receiving an indication of a polarization of at least one SSB, and/or means for determining a polarization of another beam based at least in part on the indicated polarization. The means for the UE 120 to perform operations described herein may include, for example, antenna 252, demodulator 254, MIMO detector 256, receive processor 258, transmit processor 264, TX MIMO processor 266, modulator 254, controller/processor 280, and/or memory 282.

In some aspects, an NTN entity includes means for transmitting an indication of a polarization of at least one SSB, and/or means for transmitting the SSB with the indicated polarization in a beam. The means for the NTN entity to perform operations described herein may include, for example, transmit processor 220, TX MIMO processor 230, modulator 232, antenna 234, demodulator 232, MIMO detector 236, receive processor 238, controller/processor 240, memory 242, and/or scheduler 246.

In some aspects, a UE 120 includes means for receive an indication of a polarization of a control set zero (CORESET #0) in one of a medium access control control element (MAC CE), a radio resource control (RRC) message, or an MIB; and configure one or more antennas for receiving the CORESET #0 based at least in part on the indicated polarization. The means for the UE 120 to perform operations described herein may include, for example, antenna 252, demodulator 254, MIMO detector 256, receive processor 258, transmit processor 264, TX MIMO processor 266, modulator 254, controller/processor 280, and/or memory 282.

In some aspects, a UE 120 includes means for receiving beam footprint information for each of one or more beam footprints, means for determining a respective polarization for each of the one or more beam footprints, and/or means for communicating in a beam footprint of the one or more beam footprints using the respective polarization determined for the beam footprint. The means for the UE 120 to perform operations described herein may include, for example, antenna 252, demodulator 254, MIMO detector 256, receive processor 258, transmit processor 264, TX MIMO processor 266, modulator 254, controller/processor 280, and/or memory 282.

In some aspects, an NTN entity includes means for transmitting beam footprint information for each of one or more beam footprints, the beam footprint information indicating a respective polarization for each of the one or more beam footprints, and/or means for communicating in a beam footprint of the one or more beam footprints using the respective polarization for the beam footprint. The means for the NTN entity to perform operations described herein may include, for example, transmit processor 220, TX MIMO processor 230, modulator 232, antenna 234, demodulator 232, MIMO detector 236, receive processor 238, controller/processor 240, memory 242, and/or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
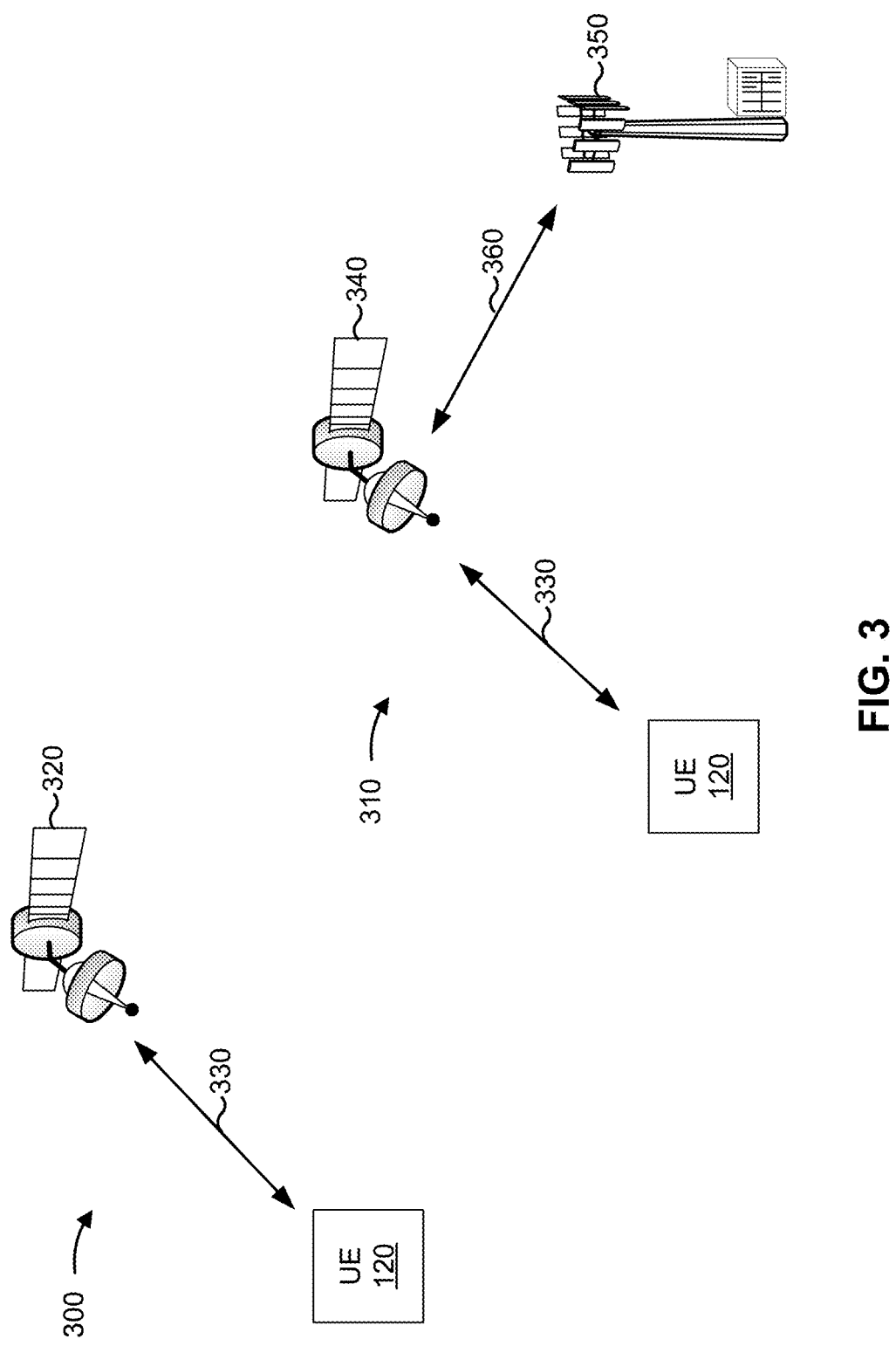
FIG. 3 is a diagram illustrating an example of a regenerative satellite deployment and an example of a transparent satellite deployment in a non-terrestrial network (NTN), in accordance with the present disclosure.

FIG. 3 is a diagram illustrating an example 300 of a regenerative satellite deployment and an example 310 of a transparent satellite deployment in an NTN, in accordance with the present disclosure.

Example 300 shows a regenerative satellite deployment. In example 300, a UE 120 is served by a satellite 320 via a service link 330. For example, the satellite 320 may include a BS 110 (e.g., BS 110a), and/or a gNB. In some aspects, the satellite 320 may be referred to as a non-terrestrial base station, a regenerative repeater, an on-board processing repeater, and/or an NTN entity. In some aspects, the satellite 320 may demodulate an uplink radio frequency signal, and may modulate a baseband signal derived from the uplink radio signal to produce a downlink radio frequency transmission. The satellite 320 may transmit the downlink radio frequency signal on the service link 330. The satellite 320 may provide a cell that covers the UE 120.

Example 310 shows a transparent satellite deployment, which may also be referred to as a bent-pipe satellite deployment. In example 310, a UE 120 is served by a satellite 340 via the service link 330. The satellite 340 may also be considered to be an NTN entity. The satellite 340 may be a transparent satellite. The satellite 340 may relay a signal received from gateway 350 via a feeder link 360. For example, the satellite may receive an uplink radio frequency transmission, and may transmit a downlink radio frequency transmission without demodulating the uplink radio frequency transmission. In some aspects, the satellite may frequency convert the uplink radio frequency transmission received on the service link 330 to a frequency of the uplink radio frequency transmission on the feeder link 360, and may amplify and/or filter the uplink radio frequency transmission. In some aspects, the UEs 120 shown in example 300 and example 310 may be associated with a Global Navigation Satellite System (GNSS) capability, a Global Positioning System (GPS) capability, and/or the like, though not all UEs have such capabilities. The satellite 340 may provide a cell that covers the UE 120.

The service link 330 may include a link between the satellite 340 and the UE 120, and may include one or more of an uplink or a downlink. The feeder link 360 may include a link between the satellite 340 and the gateway 350, and may include one or more of an uplink (e.g., from the UE 120 to the gateway 350) or a downlink (e.g., from the gateway 350 to the UE 120).

The feeder link 360 and the service link 330 may each experience Doppler effects due to the movement of the satellites 320 and 340, and potentially movement of a UE 120. These Doppler effects may be significantly larger than in a terrestrial network. The Doppler effect on the feeder link 360 may be compensated for to some degree, but may still be associated with some amount of uncompensated frequency error. Furthermore, the gateway 350 may be associated with a residual frequency error, and/or the satellite 320/340 may be associated with an on-board frequency error. These sources of frequency error may cause a received downlink frequency at the UE 120 to drift from a target downlink frequency.

As indicated above, FIG. 3 is provided as an example. Other examples may differ from what is described with regard to FIG. 3.

Figure 4:
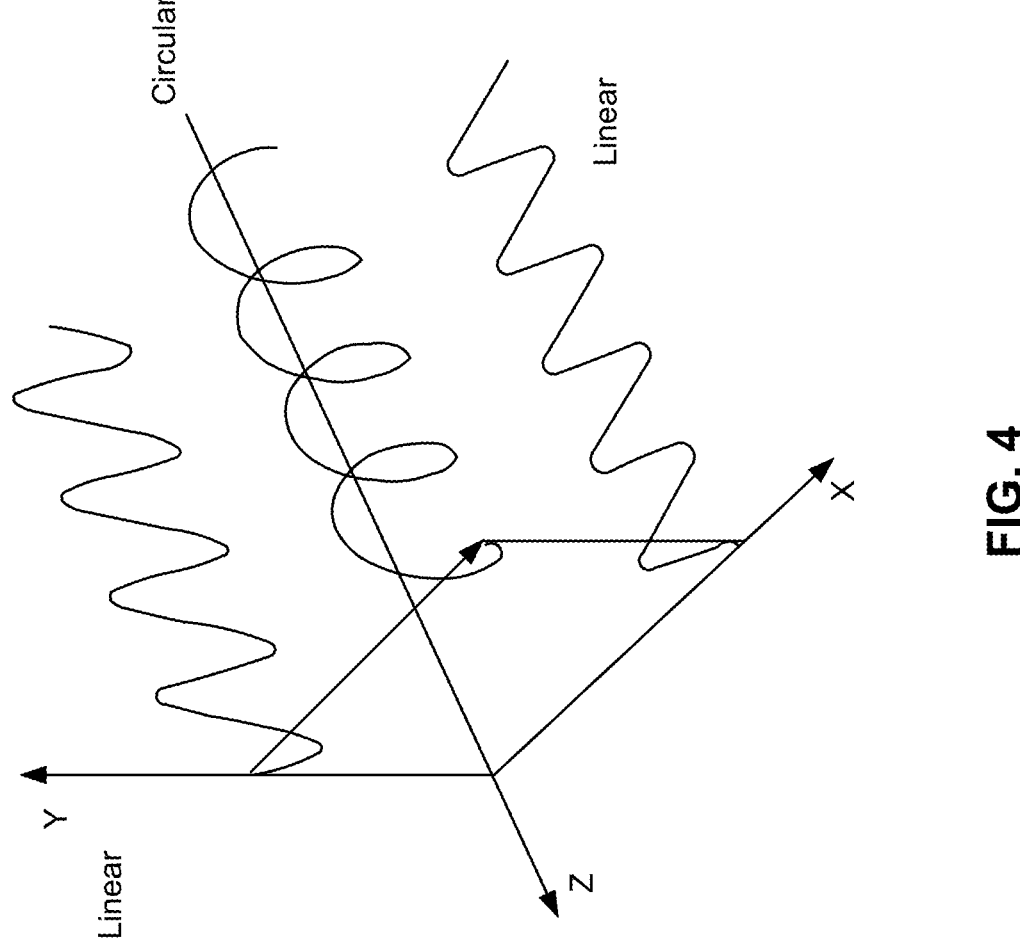
FIG. 4 is a diagram illustrating an example of linear polarization and circular polarization, in accordance with the present disclosure.

FIG. 4 is a diagram illustrating an example 400 of linear polarization and circular polarization, in accordance with the present disclosure.

An NTN entity may transmit and receive with beams that have a polarization. Linear polarization occurs when the tip of the electric field of an electromagnetic wave at a fixed point in space oscillates along a straight line over time. Circular polarization occurs when the tip of the electric field of an electromagnetic wave at a fixed point in space traces a circle, and the electromagnetic wave may be formed by superposing two orthogonal linearly polarized waves of equal amplitude and a 90-degree phase difference. A circular polarization may be a right hand circular polarization (RHCP) or a left hand circular polarization (LHCP).

"Transmit polarization" may refer to a polarization associated with a transmission from an NTN entity or a UE, and "receive polarization" may refer to a polarization associated with a reception at the NTN entity or the UE. In some cases, the transmit polarization may be the same as the receive polarization. However, in other cases, the transmit polarization may be different than the receive polarization, which may result in a polarization mismatch loss. For example, when the transmit polarization is RHCP and the receive polarization is LHCP, the polarization mismatch loss may be greater than 20 decibels (dB). When the transmit polarization is a circular polarization and the receive polarization is a linear polarization, or vice versa, the polarization mismatch loss may be about 3 dB. When the transmit polarization is a horizontal linear polarization and the receive polarization is a vertical linear polarization, the polarization mismatch loss may be greater than 20 dB.

Portable devices, such as UEs, may have varying polarization due to movement. Further, linear polarization (e.g., horizontal linear polarization or vertical linear polarization) may be less reliable than circular polarization for portable devices with respect to frequency reuse. Frequency reuse may occur when a specified range of frequencies are used more than once in a same radio system so that a total capacity of the radio system is increased without increasing an allocated bandwidth of the radio system.

A UE having a polarization capability may be able to detect a polarization and/or transmit signals with the polarization. For example, a UE capable of two circular polarization modes may be able to detect a circular polarization associated with one of the two circular polarization modes. A UE with two linearly cross-polarized antennas may detect and transmit signals using both circular polarizations. Polarization detection may increase processing at the UE and a polarization may be signaled to the UE. A signaled polarization may be accurate for a direct line of sight (LOS) communications. However, a non-LOS communication may be a reflected communications, and a reflected communication may have a different polarization than a direct LOS communication. For example, an RHCP polarization of a downlink communication may become an LHCP polarization after being reflected off of a surface. That is, a best receive polarization for a downlink communication may be different than a polarization at the point of transmission. As for uplink communications, a UE may determine a best transmit polarization to correspond to a best receive polarization assuming downlink and uplink reciprocity (e.g., the uplink and the downlink are relatively close in frequency). However, the receive polarization may be different due to signal reflection. If a polarization is different than expected, there may be a polarization mismatch loss.

As indicated above, FIG. 4 is provided as an example. Other examples may differ from what is described with regard to FIG. 4.

Figure 5:
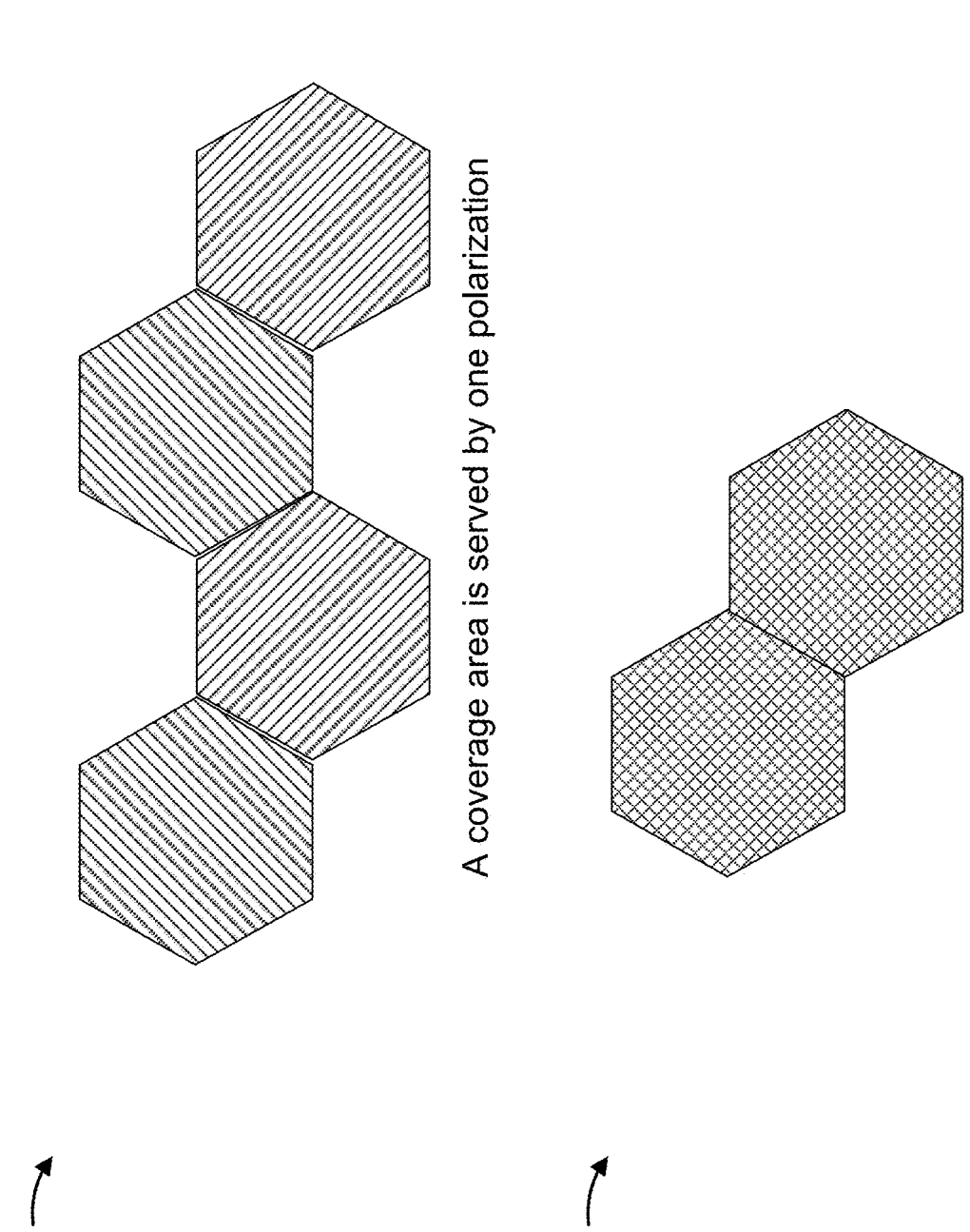
FIG. 5 is a diagram illustrating examples of coverage areas served by one or more polarizations, in accordance with the present disclosure.

FIG. 5 is a diagram illustrating examples 500 and 502 of coverage areas served by one or more polarizations, in accordance with the present disclosure.

FIG. 5 shows coverage areas or cells provided by an NTN entity, such as a non-terrestrial base station or a non-terrestrial relay station. The NTN entity may generate multiple beams associated with respective frequency regions. In some aspects, a beam may be an analog beam (e.g., generated by a cone antenna or a different type of antenna). In some aspects, the beam may be a digital beam, which may be formed by signal manipulation across an antenna array.

As shown by reference number 500, a coverage area may be served by one polarization to increase a system capacity. One polarization for the coverage area may be beneficial when the coverage area is associated with a sparse constellation of UEs, where the UEs are able to dynamically adjust a polarization. The polarization may be a circular polarization, such as an RHCP or an LHCP, or the polarization may be a linear polarization, such as a vertical linear polarization or a horizontal linear polarization.

As shown by reference number 502, a coverage area may be served by two polarizations to increase a system capacity. The two polarizations may be associated with a same frequency, or the two polarizations may be associated with different frequencies. Two polarizations for the coverage area may be beneficial when the coverage area is associated with a dense constellation of UEs. The two polarizations may be circular polarizations, or the two polarizations may be linear polarizations.

As indicated above, FIG. 5 provides some examples. Other examples may differ from what is described with regard to FIG. 5.

A downlink channel may include a physical downlink control channel (PDCCH) that carries downlink control information (DCI), a physical downlink shared channel (PDSCH) that carries downlink data, or a physical broadcast channel (PBCH) that carries system information, among other examples. In some aspects, PDSCH communications may be scheduled by PDCCH communications. As further shown, an uplink channel may include a physical uplink control channel (PUCCH) that carries uplink control information (UCI), a physical uplink shared channel (PUSCH) that carries uplink data, or a physical random access channel (PRACH) used for initial network access, among other examples. In some aspects, a UE may transmit acknowledgement (ACK) or negative acknowledgement (NACK) feedback (e.g., ACK/NACK feedback or ACK/NACK information) in UCI on the PUCCH and/or the PUSCH.

A downlink reference signal may include an SSB, a channel state information (CSI) reference signal (CSI-RS), a DMRS, a positioning reference signal (PRS), or a phase tracking reference signal (PTRS), among other examples. An uplink reference signal may include a sounding reference signal (SRS), a DMRS, or a PTRS, among other examples.

An SSB may carry information used for initial network acquisition and synchronization, such as a PSS, an SSS, a PBCH, and a PBCH DMRS. An SSB is sometimes referred to as a synchronization signal/PBCH (SS/PBCH) block. In some aspects, an NTN entity (e.g., base station, relay station) may transmit multiple SSBs on multiple corresponding beams, and the SSBs may be used for beam selection.

A CSI-RS may carry information used for downlink channel estimation (e.g., downlink CSI acquisition), which may be used for scheduling, link adaptation, or beam management, among other examples. The NTN entity may configure a set of CSI-RSs for the UE, and the UE may measure the configured set of CSI-RSs. Based at least in part on the measurements, the UE may perform channel estimation and may report channel estimation parameters to the NTN entity (e.g., in a CSI report), such as a CQI, a precoding matrix indicator (PMI), a CSI-RS resource indicator (CRI), a layer indicator (LI), a rank indicator (RI), or an RSRP, among other examples. The NTN entity or a base station may use the CSI report to select transmission parameters for downlink communications to the UE, such as a number of transmission layers (e.g., a rank), a precoding matrix (e.g., a precoder), an MCS, or a refined downlink beam (e.g., using a beam refinement procedure or a beam management procedure), among other examples.

An NTN entity may transmit an SSB with a polarization. However, an antenna configuration of a UE may not be arranged for the same polarization as the SSB. This may be due to a reflection of the signal carrying the SSB, which changes a polarization of the signal. In fact, the reflected signal may have a polarization that is the same polarization, an orthogonal polarization, or a polarization that is neither the same polarization nor an orthogonal polarization. For example, an SSB may have an RHCP at the point of transmission from an NTN entity, but after being reflected off a wall, the SSB may have an LHCP when the SSB is received by the UE. If the UE is expecting the SSB to be RHCP (based on a signaled polarization of the SSB), the antennas will be configured for RHCP. However, if the reflected SSB is LHCP, the difference between RHCP and LHCP may result in a polarization mismatch loss that causes a measurement of the reference signal to be inaccurate or to fail. Inaccurate measurements can degrade communications or cause retransmissions that would be a waste of power, processing resources, and signaling resources.

According to various aspects described herein, a UE may generate an interpretation of an indicated polarization. For example, an NTN entity may indicate a polarization of an SSB, such as RHCP. The UE may determine a polarization of another beam based at least in part on the indicated polarization. In some aspects, the UE may receive the indication of RHCP, but may receive the SSB with a polarization of LHCP. The UE may generate an interpretation of the indicated polarization by associating the received LHCP to the indicated RHCP for the SSB. By using the interpretation, the UE may determine a polarization of another beam from the NTN entity based at least in part on the SSB and the indicated polarization. The UE may have a better polarization match for signals on the other beam or for other signals from the NTN entity. As a result, transmission detection is more successful, and polarization mismatch loss is minimized. The UE conserves power, processing resources, and signaling resources that would otherwise be consumed by degraded communications or retransmissions due to unsuccessful signal detection or polarization mismatch loss.

In some aspects, if the UE's received signal has a polarization that is the same polarization as what was indicated, the UE may interpret a future indicated polarization as being correct. If the UE's received polarization is orthogonal to (or cross-polarized with respect to) the indicated polarization, the UE may interpret a future indicated polarization as the orthogonal polarization. If the UE's received polarization is neither the same polarization nor an orthogonal polarization, the UE may interpret a future indicated polarization as being a polarization that was last received.

Figure 6:
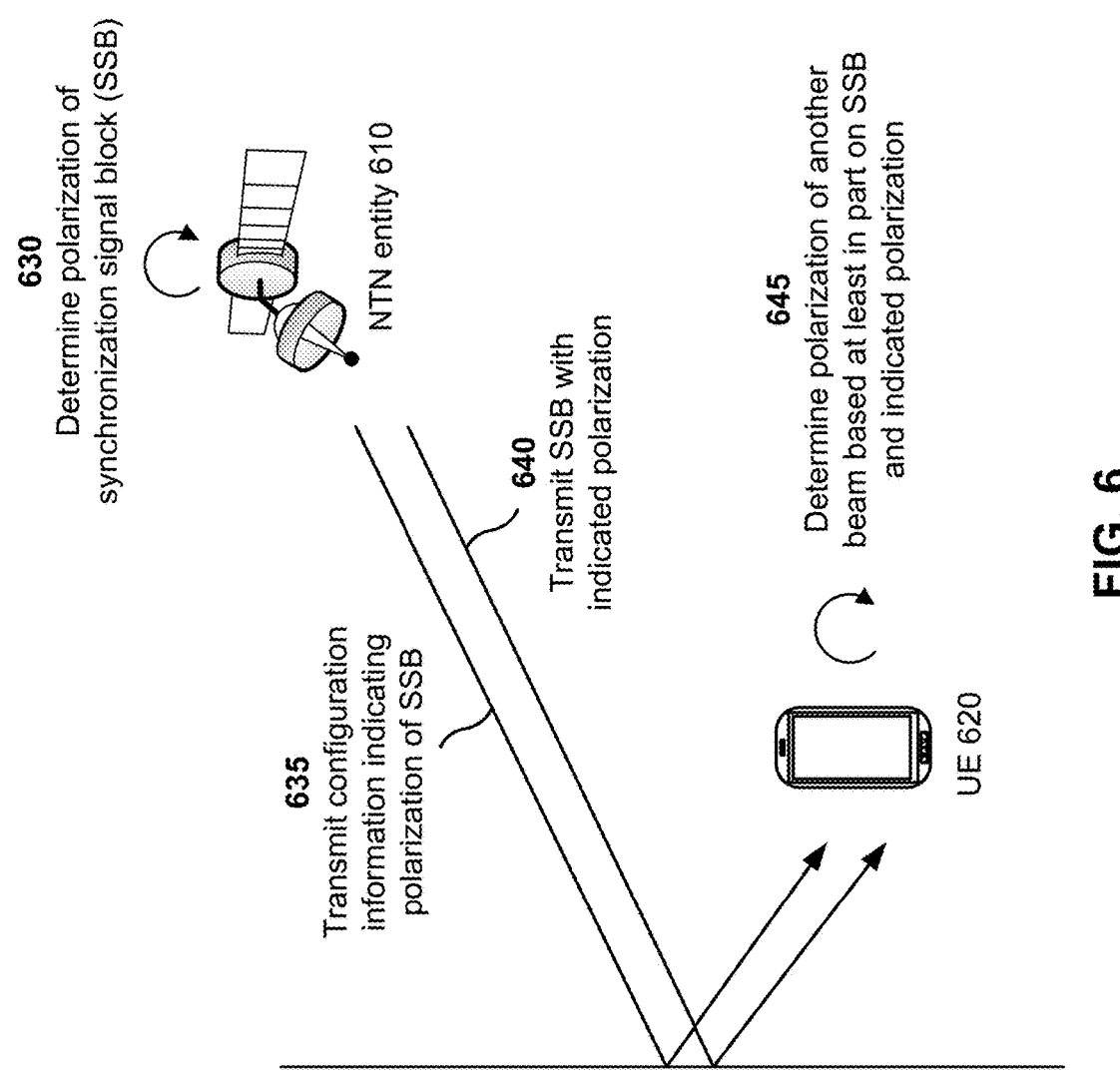
FIG. 6 is a diagram illustrating an example of a polarization indication for a synchronization signal block (SSB), in accordance with the present disclosure.

FIG. 6 is a diagram illustrating an example 600 of a polarization indication for an SSB, in accordance with the present disclosure. As shown, FIG. 6 includes an NTN entity 610 (e.g., base station, relay station) and a UE 620. In some aspects, UE 620 may include a ground station.

As shown by reference number 630, NTN entity 610 may determine a polarization for an SSB. For example, NTN entity 610 may determine the polarization for the SSB to be RHCP, LHCP, or a linear polarization. NTN entity 610 may determine the polarization based at least in part on a configuration of UE 620, a previous indication of a polarization, channel conditions, and/or feedback from UEs. NTN entity 610 may select the polarization for the SSB from among multiple polarizations, which may include a reference (nominal) polarization, and a second polarization that is orthogonal to the reference polarization. The reference polarization may be RHCP, and the second polarization may be LHCP, or vice versa. This may resolve an ambiguity of polarization due to reflection, which may change the polarization.

As shown by reference number 635, NTN entity 610 may transmit an indication of the polarization of the SSB (or multiple SSBs). In some aspects, NTN entity 610 may transmit the indication of the polarization of the SSB in a system information block (SIB). A polarization may be associated with each beam of a plurality of beams, where a beam is identified by an SSB index, a satellite beam index, Physical Cell Identity (PCI), and/or a satellite index. The beam may be from the same cell, or a neighboring cell. The satellite index may correspond to the satellite that transmits the SIB or a neighboring satellite. The indication of the polarization in the SIB allows UE 620 to determine the polarization of other beams once UE 620 detects a beam. This saves polarization detection time, because UE 620 may need a matching polarization in order to receive the SIB.

Alternatively, or additionally, NTN entity 610 may transmit the indication of the polarization of the SSB in a PBCH transmission, such as in a master information block (MIB). NTN entity 610 may select a scrambling sequence for PBCH payload bits, from among multiple scrambling sequences. NTN entity 610 may select a DMRS sequence for a PBCH, from among multiple DMRS sequences for the PBCH. Transmitting the indication of the polarization in a PBCH transmission may be useful for indicating the polarization of CORESET #0s, which are transmitted before a UE can receive an SIB.

As shown by reference number 640, NTN entity 610 may transmit the SSB with the indicated polarization. UE 620 may receive the SSB, but the polarization of the SSB may be the same as, or may differ from, the indicated polarization. UE 620 may determine an interpretation of the indicated polarization based at least in part on the SSB and the indicated polarization. For example, UE 620 may associate the polarization of the SSB with the indicated polarization, where the polarization of the SSB differs from the indicated polarization.

In some aspects, UE 620 may measure a quality (e.g., RSRP) of multiple communications within a time window using receive antenna polarizations from among multiple polarizations. UE 620 may interpret a receive polarization for an indicated polarization as being a polarization carried by a communication with the best quality of the measured communications, or carried by a communication with a quality that satisfies a threshold. This may help to avoid polarization mismatch loss. In some aspects, UE 620 may receive a single communication, but may process the communication using different receive antenna polarizations to interpret the indicated polarization.

As shown by reference number 645, UE 620 may determine a polarization of another beam with the interpretation of the indicated polarization, which was determined from the SSB and the indicated polarization. UE 620 may better match a communication with the other beam or with a later communication in the same beam. UE 620 may save time, processing resources, and signaling resources otherwise consumed by detecting a polarization of the reference signal, or by experiencing polarization mismatch loss.

As indicated above, FIG. 6 is provided as an example. Other examples may differ from what is described with regard to FIG. 6.

Figure 7:
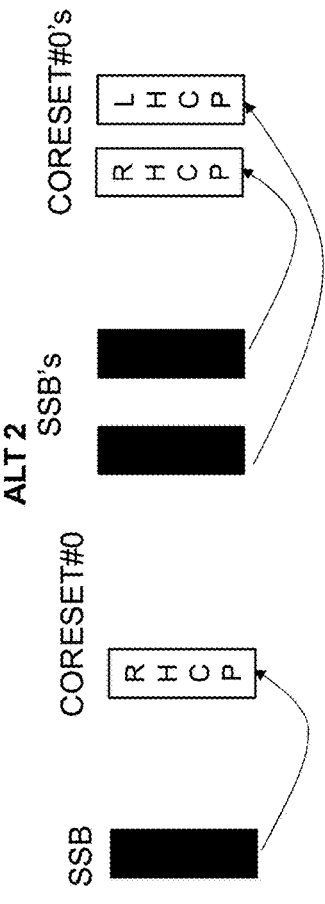
FIG. 7 is a diagram illustrating an example of polarization indications for control resource sets, in accordance with the present disclosure.
Figure 7:
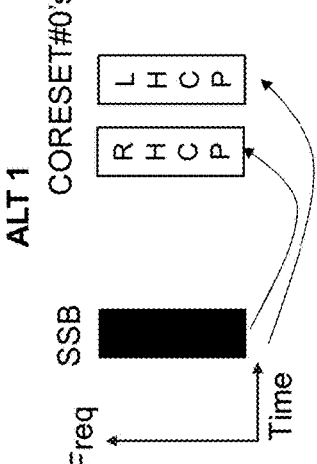

FIG. 7 is a diagram illustrating an example 700 of polarization indications for CORESETs, in accordance with the present disclosure.

A polarization of a CORESET #0 may be the same as a polarization of the SSB, which configures the CORESET #0. However, the polarization of the SSB may be different than the polarization of the CORESET #0. An NTN entity may transmit SSBs with two polarizations to facilitate a cell search, but the NTN entity may transmit the CORESET #0 in only one polarization. A UE may detect an SSB in one polarization, but the UE may need to use a correct polarization for receiving CORESET #0.

According to various aspects described herein, the NTN entity may indicate a polarization of the CORESET #0 in an SSB. In some aspects, the SSB may indicate a polarization for each of one or more CORESET #0s, each having one of multiple polarizations. This is shown in example 700 by alternative 1 (ALT 1). A quantity of CORESET #0s may be preconfigured, and the CORESET #0s may have distinct polarizations.

In some aspects, if SSBs are transmitted in multiple polarizations, an SSB may indicate a polarization for a single CORESET #0. This is shown in example 700 by alternative 2 (ALT 2). The polarization of the CORESET #0 may have the same polarization as the SSB that the UE identified during a most recent random access channel (RACH) procedure that was not initiated by a PDCCH order that triggers a contention-free RACH. The SSB may indicate a polarization of the CORESET #0 that is dynamically configured, which may be beneficial for load balancing. Such a configuration may be in the MIB (e.g., by the controlResourceSetZero information element).

In some aspects, a MAC CE may indicate a polarization of one or more CORESET #0s. The MAC CE may specify the CORESET #0. In some aspects, the MAC CE may indicate that a polarization for a CORESET #0 is relative to a polarization of a reference signal (e.g., same or orthogonal). A transmission configuration indicator (TCI) state may indicate a quasi-co-location (QCL) type, which represents a polarization relationship between the polarization for the reference signal and the polarization for the CORESET #0. In some aspects, the TCI may indicate a re-interpreted QCL type. For example, QCL type D, which is normally set aside for a spatial receive parameter, may be re-interpreted as a polarization relationship. The MAC CE may be used to update the polarization of the CORESET #0 after an initial access.

In some aspects, an RRC may indicate the polarization of the CORESET #0. For example, the indication may be indicated in an information element such as ServingCell-ConfigCommon. This may be useful for a UE being handed over to determine a polarization of a new cell.

In some aspects, an NTN entity may transmit a SIB1 to configure an initial downlink bandwidth part (BWP) with a polarization and configure an initial uplink BWP with a polarization. The initial BWPs may be indicated in relation to the polarization of the CORESET #0. For example, the polarization of the initial downlink BWP may be the same polarization as the polarization of the CORESET #0, and the polarization of the initial uplink BWP may be orthogonal to the polarization of the CORESET #0. Alternatively, the polarization of the initial downlink BWP and the polarization of the initial uplink BWP may be the same polarization as the CORESET #0.

In some aspects, the NTN entity may specify the polarization of the initial uplink BWP and the polarization of the initial downlink BWP. For example, the NTN entity may indicate that the polarization of the initial downlink BWP is RHCP, and the polarization of the initial uplink BWP is LHCP. The NTN entity may indicate that the polarization for both the initial downlink BWP and the initial uplink BWP is the same (e.g., RHCP). Alternatively, or additionally, the NTN entity may indicate a polarization of a BWP relative to a polarization of a reference signal and/or a polarization of an SSB.

As indicated above, FIG. 7 is provided as an example. Other examples may differ from what is described with regard to FIG. 7.

Figure 8:
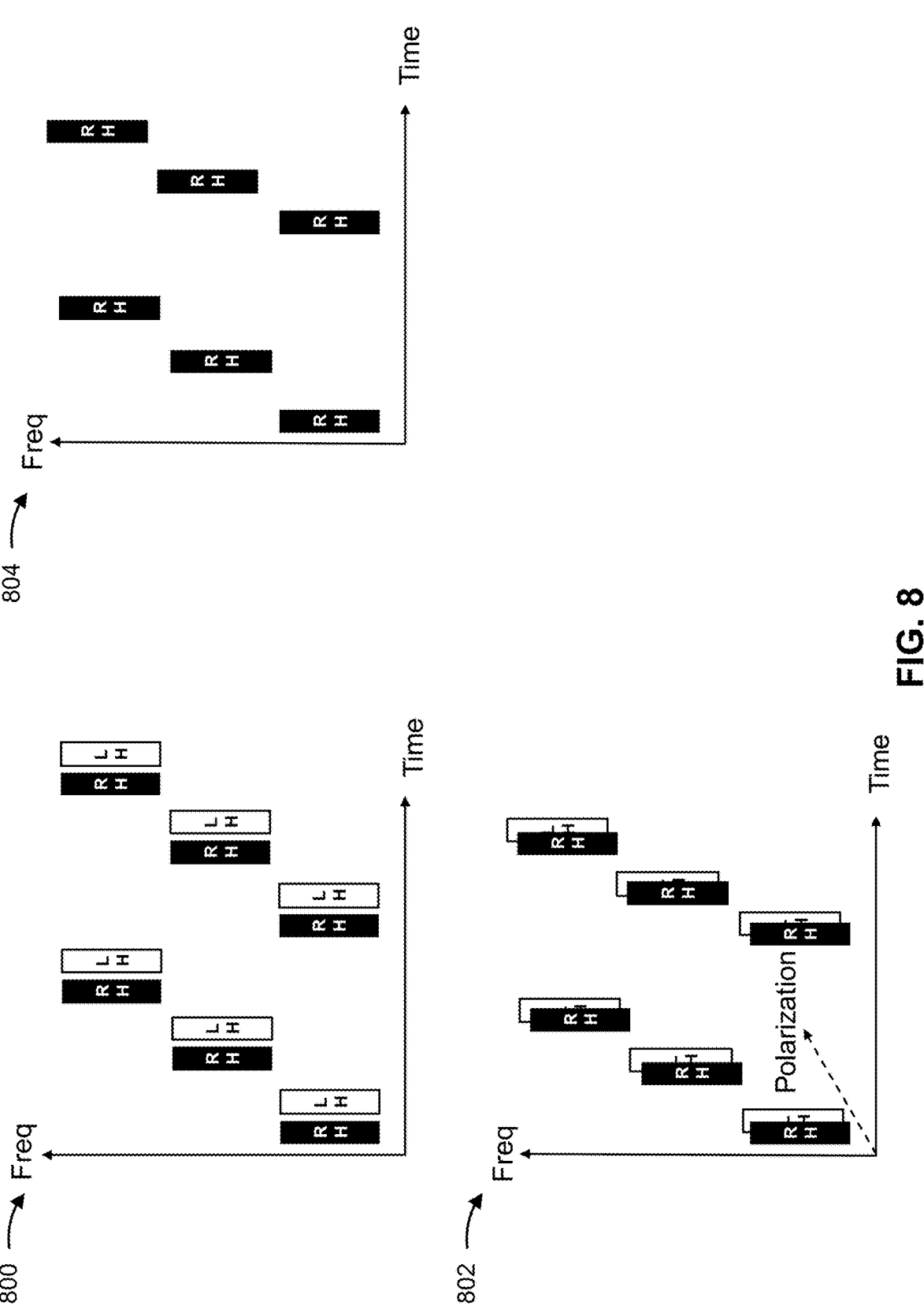
FIG. 8 is a diagram illustrating examples of SSB patterns with polarization, in accordance with the present disclosure.

FIG. 8 is a diagram illustrating examples 800, 802, 804 of SSB patterns with polarization, in accordance with the present disclosure.

The NTN entity may transmit SSBs in a 3-dimensional grid of time, frequency and polarization. The NTN entity may transmit an indication of one or more SSB patterns in an SIB. If the NTN entity transmits SSBs in pairs, one polarization may be RHCP and the other polarization may be LHCP. Example 800 shows a pattern of SSB pairs where the SSBs, with different polarizations, are transmitted at different times. Example 802 shows a pattern where the NTN entity transmits SSBs of an SSB pair at the same time. While the SSBs may be transmitted at the same time, the SSBs may have different polarizations. Example 804 shows a pattern where the NTN entity transmits SSBs with only a predetermined polarization. This may be a simpler design but transmitting only a predetermined polarization may increase a cell search time for the UE. By indicating an SSB pattern, by way of time, frequency, and polarization, the UE saves time, power, processing resources, and signaling resources that would otherwise be consumed by detecting polarization for each SSB.

As indicated above, FIG. 8 provides some examples. Other examples may differ from what is described with regard to FIG. 8.

Figure 9:
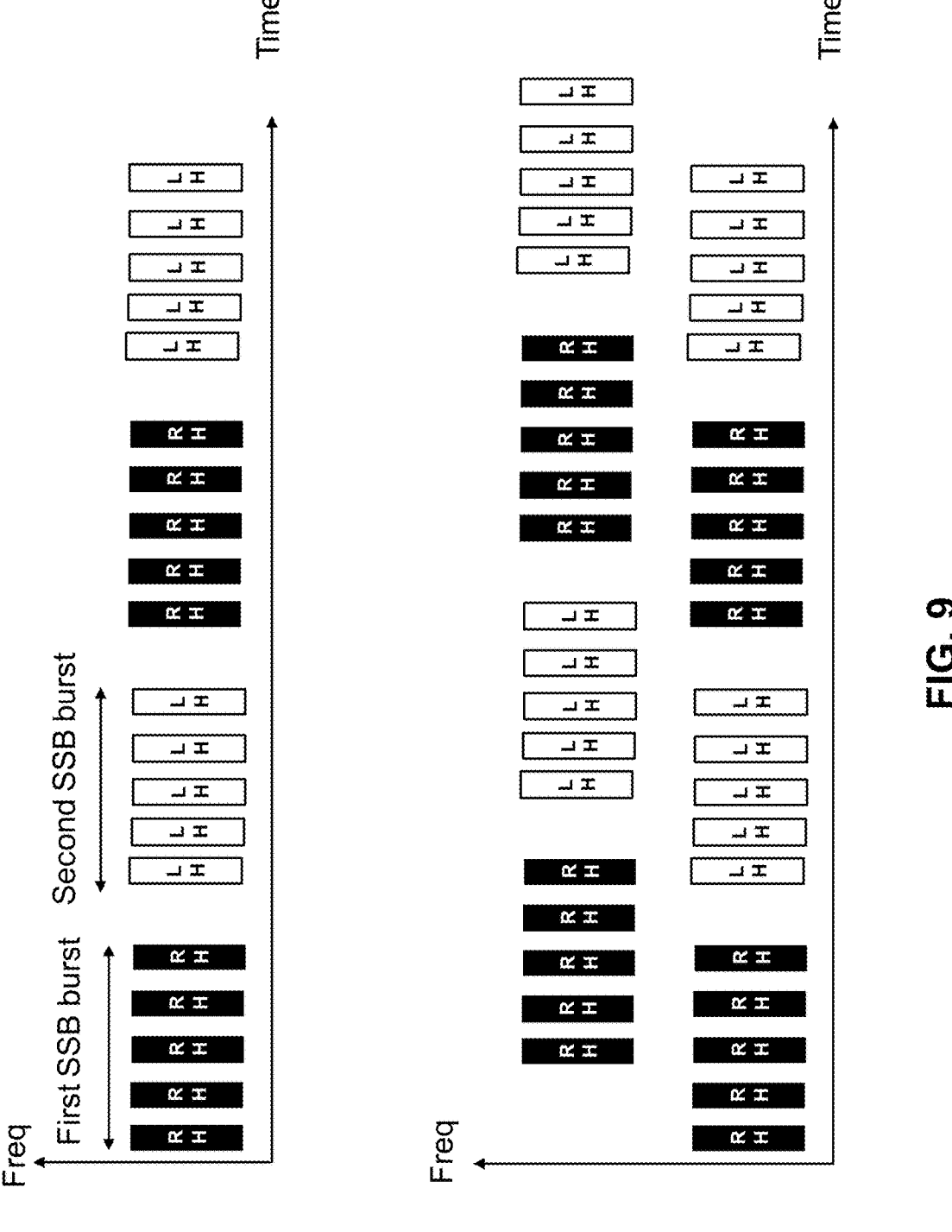
FIG. 9 is a diagram illustrating an example of SSB patterns, in accordance with the present disclosure.

FIG. 9 is a diagram illustrating an example 900 of SSB patterns, in accordance with the present disclosure.

The NTN entity may transmit bursts of SSBs, with each SSB burst alternating polarization. For example, as shown by example 900, a first SSB burst may be RHCP. The UE may detect a polarization of a first SSB of a first SSB burst and then determine the polarization of each remaining SSB in the first SSB burst. The UE may determine that a polarization of the second SSB burst may be another polarization, such as LHCP. The UE may determine a polarization of any SSB in a grid of SSB bursts. The UE avoids detecting a polarization for many SSBs.

As indicated above, FIG. 9 is provided as an example. Other examples may differ from what is described with regard to FIG. 9.

Figure 10:
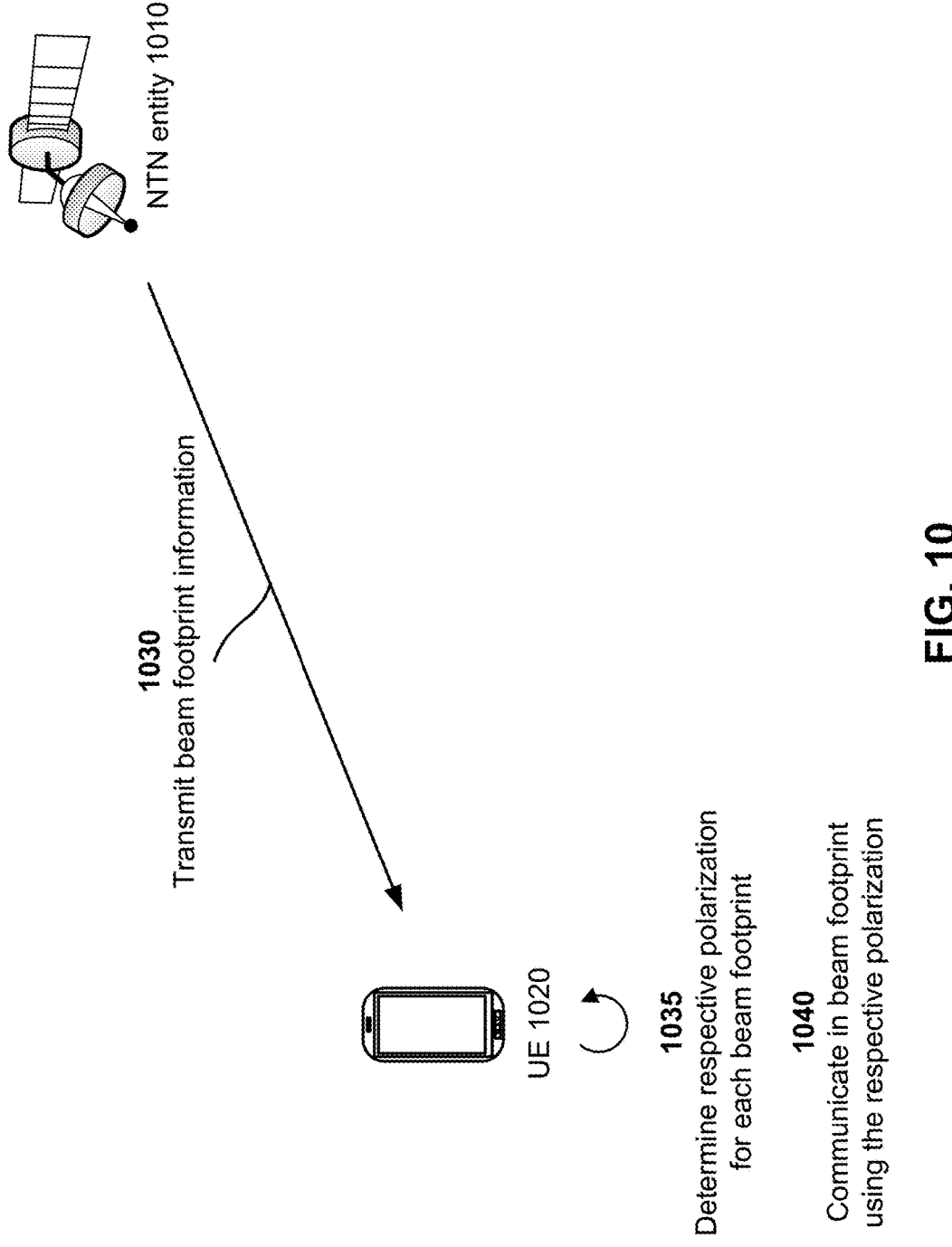
FIG. 10 is a diagram illustrating an example of a polarization indication for a beam footprint, in accordance with the present disclosure.

FIG. 10 is a diagram illustrating an example 1000 of a polarization indication for a beam footprint, in accordance with the present disclosure. As shown, FIG. 10 includes an NTN entity 1010 (e.g., base station, relay station) and a UE 1020. In some aspects, UE 1020 may include a ground station.

NTN entity 1010 may determine a polarization for a beam footprint. NTN entity 1010 may determine the polarization based on channel conditions for a beam associated with a beam footprint, a UE capability, and/or a polarization of neighboring beam footprints. As shown by reference number 1030, NTN entity 1010 may transmit beam footprint information that includes an indication of a respective polarization for each of one or more beam footprints. NTN entity 1010 may transmit the beam footprint information in an SIB.

The beam footprint information may include a specific polarization for each beam footprint. The beam footprint information may include an indication that a polarization is relative to a polarization of a reference signal or a polarization of an SSB. The beam corresponding to the beam footprint may be associated with an SSB, a CORESET #0, an initial downlink BWP, and/or a PCI. The beam footprint information may be for beam footprints of NTN entity 1010 and/or of neighboring NTN entities. The beam footprint information may specify a beam footprint by a beam center location, a beam shape, a size, an orientation, and/or a set of coordinates on a boundary. UE 1020 may also calculate, from the beam footprint information, the beam footprint from parameters signaled from NTN entity 1010 or another NTN entity. As shown by reference number 1035, the UE 1020 may determine a respective polarization for each footprint. As shown by reference number 1040, the UE 1020 may communicate in the beam footprint using the respective polarization.

By receiving an indication of a polarization of a beam footprint, UE 1020 may save time, processing resources, and signaling resources detecting a polarization of a beam footprint.

As indicated above, FIG. 10 is provided as an example. Other examples may differ from what is described with regard to FIG. 10.

Figure 11:
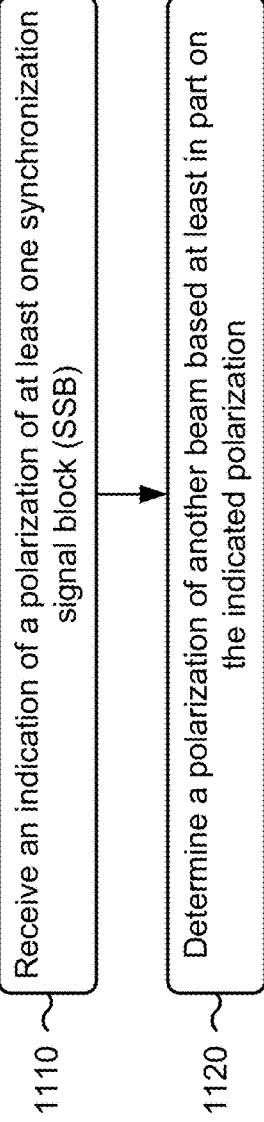
FIG. 11 is a diagram illustrating an example process performed, for example, by a UE, in accordance with the present disclosure.
Figure 11:

FIG. 11 is a diagram illustrating an example process 1100 performed, for example, by a UE, in accordance with the present disclosure. Example process 1100 is an example where the UE (e.g., a UE 120 depicted in FIGS. 1-3, UE 620 in FIG. 6) performs operations associated with polarization indications for SSBs and CORESET #0s.

As shown in FIG. 11, in some aspects, process 1100 may include receiving an indication of a polarization of at least one SSB (block 1110). For example, the UE (e.g., using reception component 1602 depicted in FIG. 16) may receive an indication of a polarization of at least one SSB, as described above.

As further shown in FIG. 11, in some aspects, process 1100 may include determining a polarization of another beam based at least in part on the indicated polarization (block 1120). For example, the UE (e.g., using determination component 1608 depicted in FIG. 16) may determine a polarization of another beam based at least in part on the indicated polarization, as described above.

Process 1100 may include additional aspects, such as any single aspect or any combination of aspects described below and/or in connection with one or more other processes described elsewhere herein.

With respect to process 1100, in a first aspect, receiving the indication includes receiving the indication in an SIB.

In a second aspect, alone or in combination with the first aspect, the indication associates a polarization with each beam of one or more beams, and each beam is identified by one or more of an SSB index, a satellite beam index, a PCI, or a satellite index.

In a third aspect, alone or in combination with one or more of the first and second aspects, process 1100 includes receiving at least one SSB in a beam with the indicated polarization, and receiving the indication includes receiving the indication on a PBCH.

In a fourth aspect, alone or in combination with one or more of the first through third aspects, receiving the indication includes receiving the indication in an MIB.

In a fifth aspect, alone or in combination with one or more of the first through fourth aspects, the MIB indicates a polarization of a CORESET #0.

In a sixth aspect, alone or in combination with one or more of the first through fifth aspects, the indication is encoded with scrambling sequences for bits of the PBCH.

In a seventh aspect, alone or in combination with one or more of the first through sixth aspects, the indication is a DMRS for the PBCH.

In an eighth aspect, alone or in combination with one or more of the first through seventh aspects, the indication indicates a polarization from among polarizations that are orthogonal to one another.

In a ninth aspect, alone or in combination with one or more of the first through eighth aspects, process 1100 includes determining an interpretation of the indicated polarization based at least in part on a receive antenna polarization, and communicating using an antenna configuration that is based at least in part on the interpretation.

In a tenth aspect, alone or in combination with one or more of the first through ninth aspects, determining the interpretation of the indicated polarization includes measuring a quality of a communication for each of a plurality of receive antenna polarizations and associate a receive antenna polarization with the indicated polarization based at least in part on quality measurements for the plurality of receive antenna polarizations.

In an eleventh aspect, alone or in combination with one or more of the first through tenth aspects, process 1100 includes receiving at least one SSB in a beam with the indicated polarization, and the at least one SSB indicates a polarization for each of one or more CORESET #0s.

In a twelfth aspect, alone or in combination with one or more of the first through eleventh aspects, process 1100 includes determining a polarization of a CORESET #0 to be a same polarization as the SSB.

In a thirteenth aspect, alone or in combination with one or more of the first through twelfth aspects, process 1100 includes receiving an indication of a polarization of an initial BWP and a polarization of an initial uplink BWP in a SIB 1.

In a fourteenth aspect, alone or in combination with one or more of the first through thirteenth aspects, process 1100 includes receiving an indication of a polarization of a CORESET #0, and determining an indication of a polarization of an initial downlink BWP and a polarization of an initial uplink bandwidth part based at least in part on one or more of the polarization of the CORESET #0 or the polarization of the at least one SSB.

In a fifteenth aspect, alone or in combination with one or more of the first through fourteenth aspects, process 1100 includes receiving, in system information, an indication of an SSB pattern of one or more of a time resource, a frequency resource, or a polarization, and monitoring for SSBs, SSB pairs, or SSB bursts based at least in part on the SSB pattern.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
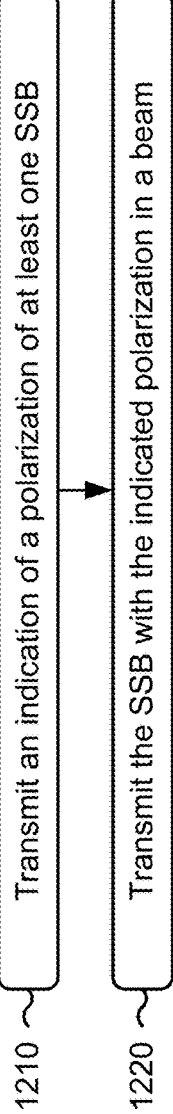
FIG. 12 is a diagram illustrating an example process performed, for example, by an NTN entity, in accordance with the present disclosure.

FIG. 12 is a diagram illustrating an example process 1200 performed, for example, by an NTN entity, in accordance with the present disclosure. Example process 1200 is an example where the NTN entity (e.g., the NTN entity depicted in FIGS. 1 and 2, NTN entity 610 depicted in FIG. 6) performs operations associated with polarization indications for SSBs and/or CORESET #0s.

As shown in FIG. 12, in some aspects, process 1200 may include transmitting an indication of a polarization of at least one SSB (block 1210). For example, the NTN entity (e.g., using transmission component 1704 depicted in FIG. 17) may transmit an indication of a polarization of at least one SSB, as described above.

As further shown in FIG. 12, in some aspects, process 1200 may include transmitting the SSB with the indicated polarization in a beam (block 1220). For example, the NTN entity (e.g., using transmission component 1704 depicted in FIG. 17) may transmit the SSB with the indicated polarization in a beam, as described above.

Process 1200 may include additional aspects, such as any single aspect or any combination of aspects described below and/or in connection with one or more other processes described elsewhere herein.

With respect to process 1200, in a first aspect, transmitting the indication includes transmitting the indication in an SIB.

In a second aspect, alone or in combination with the first aspect, transmitting the indication includes transmitting the indication on a PBCH.

In a third aspect, alone or in combination with one or more of the first and second aspects, the SSB indicates a polarization for each of one or more CORESET #0s.

In a fourth aspect, alone or in combination with one or more of the first through third aspects, process 1200 includes transmitting an indication of a polarization of a CORESET #0 in a MAC CE or an RRC message.

In a fifth aspect, alone or in combination with one or more of the first through fourth aspects, process 1200 includes transmitting an indication of a polarization of an initial downlink BWP and a polarization of an initial uplink BWP in a SIB 1.

In a sixth aspect, alone or in combination with one or more of the first through fifth aspects, process 1200 includes transmitting, in system information, an indication of an SSB pattern of one or more of time, frequency, or polarization, and transmitting SSBs, SSB pairs, or SSB bursts based at least in part on the SSB pattern.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
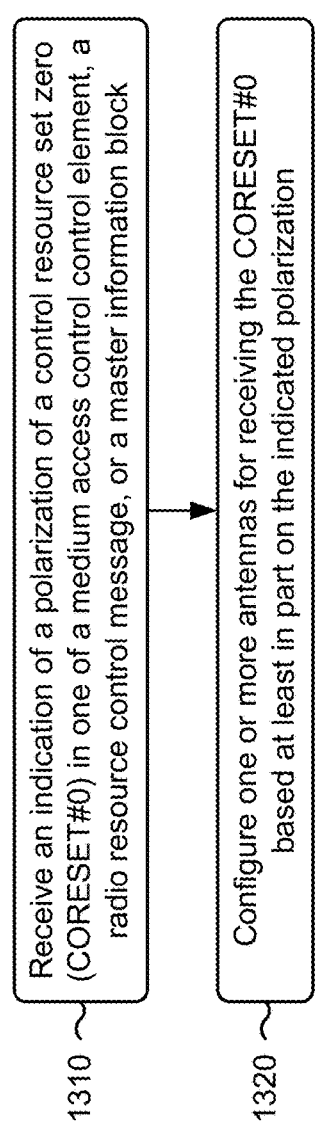
FIG. 13 is a diagram illustrating an example process performed, for example, by a UE, in accordance with the present disclosure.

FIG. 13 is a diagram illustrating an example process 1300 performed, for example, by a UE, in accordance with the present disclosure. Example process 1300 is an example where the UE (e.g., a UE 120 depicted in FIGS. 1-3, UE 620 in FIG. 6) performs operations associated with polarization indications for CORESET #0.

As shown in FIG. 13, in some aspects, process 1300 may include receiving an indication of a polarization of a CORESET #0 in one of a MAC CE, an RRC message, or an MIB (block 1310). For example, the UE (e.g., using reception component 1802 depicted in FIG. 18) may receive an indication of a polarization of a CORESET #0 in one of a MAC CE, an RRC message, or an MIB, as described above.

As further shown in FIG. 13, in some aspects, process 1300 may include configuring one or more antennas for receiving the CORESET #0 based at least in part on the indicated polarization (block 1320). For example, the UE (e.g., using configuration component 1808 depicted in FIG. 18) may configure one or more antennas for receiving the CORESET #0 based at least in part on the indicated polarization, as described above.

Process 1300 may include additional aspects, such as any single aspect or any combination of aspects described below and/or in connection with one or more other processes described elsewhere herein.

With respect to process 1300, in a first aspect, the indication of the polarization of the CORESET #0 specifies the polarization of the CORESET #0.

In a second aspect, alone or in combination with the first aspect, the indication of the polarization of the CORESET #0 includes one or more TCI states that indicate a QCL type, and wherein the one or more processors are configured to determine the polarization of the CORESET #0 based at least in part on the one or more TCI state.

Although FIG. 13 shows example blocks of process 1300, in some aspects, process 1300 may include additional blocks, fewer blocks, different blocks, or differently arranged blocks than those depicted in FIG. 13. Additionally, or alternatively, two or more of the blocks of process 1300 may be performed in parallel.

Figure 14:
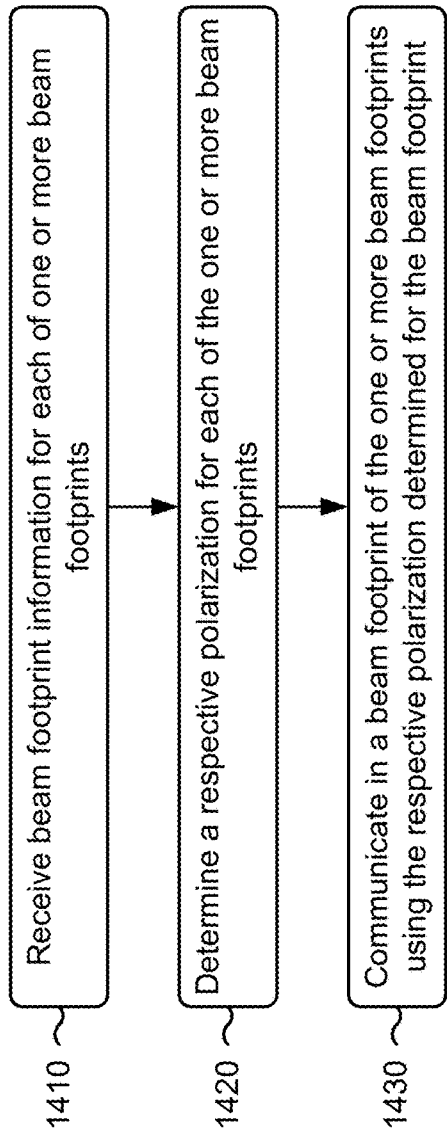
FIG. 14 is a diagram illustrating an example process performed, for example, by a UE, in accordance with the present disclosure.

FIG. 14 is a diagram illustrating an example process 1400 performed, for example, by a UE, in accordance with the present disclosure. Example process 1400 is an example where the UE (e.g., a UE 120 depicted in FIGS. 1-3, UE 1020 depicted in FIG. 10) performs operations associated with polarization indications for beam footprints.

As shown in FIG. 14, in some aspects, process 1400 may include receiving beam footprint information for each of one or more beam footprints (block 1410). For example, the UE (e.g., using reception component 1902 depicted in FIG. 19) may receive beam footprint information for each of one or more beam footprints, as described above.

As further shown in FIG. 14, in some aspects, process 1400 may include determining a respective polarization for each of the one or more beam footprints (block 1420). For example, the UE (e.g., using determination component 1908 depicted in FIG. 19) may determine a respective polarization for each of the one or more beam footprints, as described above.

As further shown in FIG. 14, in some aspects, process 1400 may include communicating in a beam footprint of the one or more beam footprints using the respective polarization determined for the beam footprint (block 1430). For example, the UE (e.g., using reception component 1702 and transmission component 1904 depicted in FIG. 19) may communicate in a beam footprint of the one or more beam footprints using the respective polarization determined for the beam footprint, as described above.

Process 1400 may include additional aspects, such as any single aspect or any combination of aspects described below and/or in connection with one or more other processes described elsewhere herein.

With respect to process 1400, in a first aspect, determining the respective polarization includes determining the respective polarization from an indication of the polarization in the beam footprint information.

In a second aspect, alone or in combination with the first aspect, determining the respective polarization includes determining the respective polarization based at least in part on the beam footprint information and a reference polarization.

In a third aspect, alone or in combination with one or more of the first and second aspects, the beam footprint is for a beam associated with one or more of an SSB, a CORESET #0, an initial downlink BWP, or a PCI.

In a fourth aspect, alone or in combination with one or more of the first through third aspects, process 1400 includes determining the beam footprint from one or more of a beam center, a beam shape, a beam size, a beam orientation, beam coordinates, an antenna tilt angle of an NTN entity, or an orbit of an NTN entity.

In a fifth aspect, alone or in combination with one or more of the first through fourth aspects, receiving the beam footprint information includes receiving the beam footprint information in an SIB.

Although FIG. 14 shows example blocks of process 1400, in some aspects, process 1400 may include additional blocks, fewer blocks, different blocks, or differently arranged blocks than those depicted in FIG. 14. Additionally, or alternatively, two or more of the blocks of process 1400 may be performed in parallel.

Figure 15:
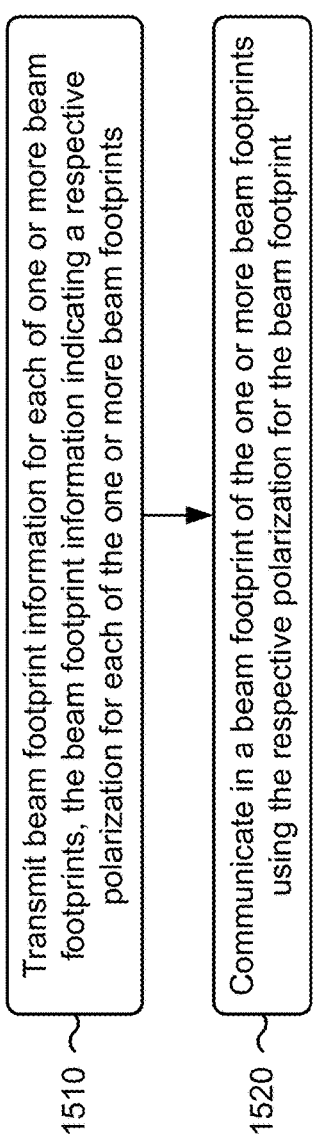
FIG. 15 is a diagram illustrating an example process performed, for example, by an NTN entity, in accordance with the present disclosure.

FIG. 15 is a diagram illustrating an example process 1500 performed, for example, by an NTN entity, in accordance with the present disclosure. Example process 1500 is an example where the NTN entity (e.g., the NTN entity depicted in FIGS. 1 and 2, NTN entity 1010 depicted in FIG. 10) performs operations associated with polarization indications for beam footprints.

As shown in FIG. 15, in some aspects, process 1500 may include transmitting beam footprint information for each of one or more beam footprints, the beam footprint information indicating a respective polarization for each of the one or more beam footprints (block 1510). For example, the NTN entity (e.g., using transmission component 2004 depicted in FIG. 20) may transmit beam footprint information for each of one or more beam footprints, the beam footprint information indicating a respective polarization for each of the one or more beam footprints, as described above.

As further shown in FIG. 15, in some aspects, process 1500 may include communicating in a beam footprint of the one or more beam footprints using the respective polarization for the beam footprint (block 1520). For example, the NTN entity (e.g., using reception component 2002 and transmission component 2004 depicted in FIG. 20) may communicate in a beam footprint of the one or more beam footprints using the respective polarization for the beam footprint, as described above.

Process 1500 may include additional aspects, such as any single aspect or any combination of aspects described below and/or in connection with one or more other processes described elsewhere herein.

With respect to process 1500, in a first aspect, the beam footprint is for a beam associated with one or more of an SSB, a CORESET #0, an initial downlink BWP, or a PCI.

Although FIG. 15 shows example blocks of process 1500, in some aspects, process 1500 may include additional blocks, fewer blocks, different blocks, or differently arranged blocks than those depicted in FIG. 15. Additionally, or alternatively, two or more of the blocks of process 1500 may be performed in parallel.

Figure 16:
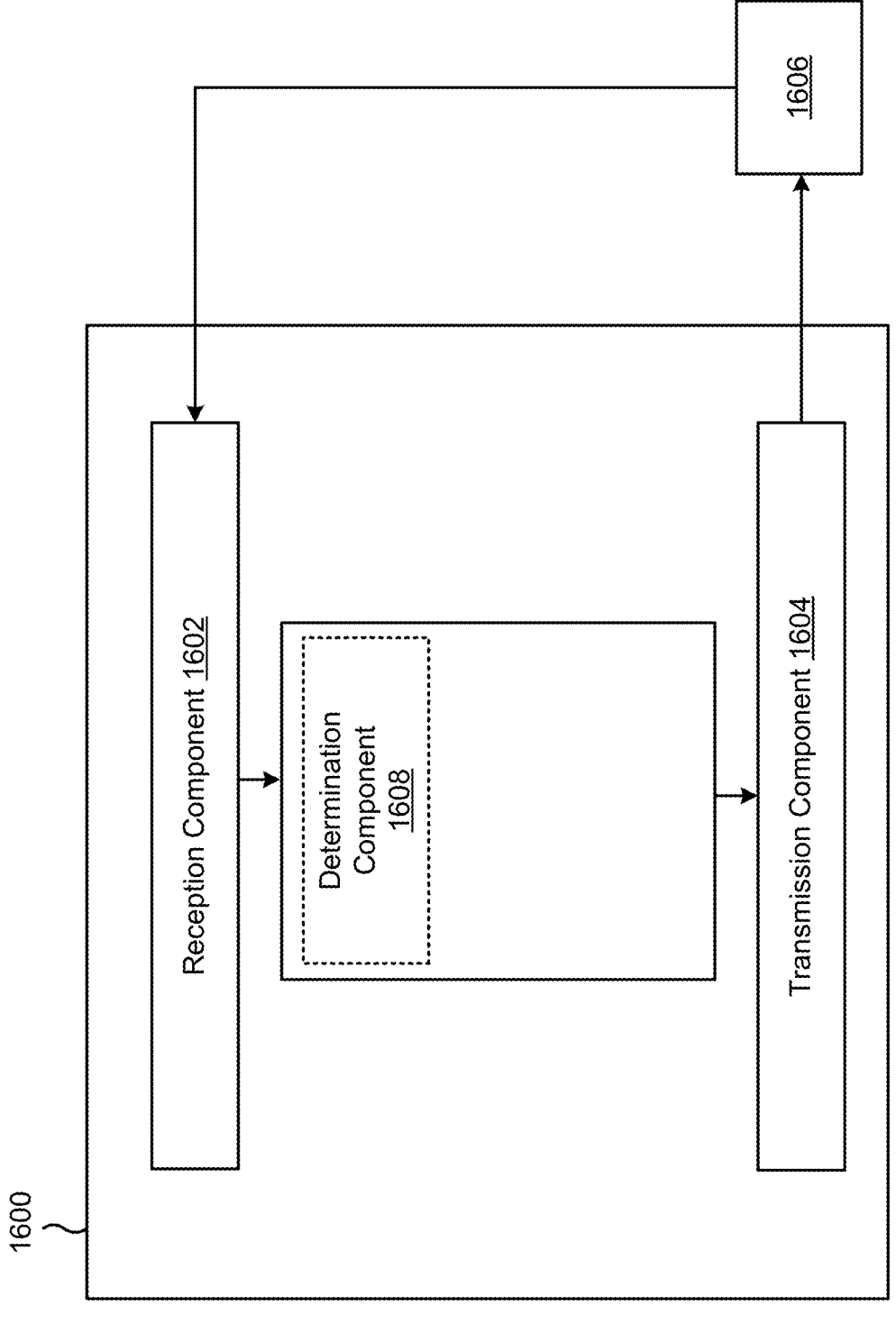
FIGS. 16-20 are block diagrams of example apparatuses for wireless communication, in accordance with the present disclosure.

FIG. 16 is a block diagram of an example apparatus 1600 for wireless communication. The apparatus 1600 may be a UE, or a UE may include the apparatus 1600. In some aspects, the apparatus 1600 includes a reception component 1602 and a transmission component 1604, which may be in communication with one another (for example, via one or more buses and/or one or more other components). As shown, the apparatus 1600 may communicate with another apparatus 1606 (such as a UE, a base station, or another wireless communication device) using the reception component 1602 and the transmission component 1604. As further shown, the apparatus 1600 may include a determination component 1608, among other examples.

In some aspects, the apparatus 1600 may be configured to perform one or more operations described herein in connection with FIGS. 1-10. Additionally, or alternatively, the apparatus 1600 may be configured to perform one or more processes described herein, such as process 1100 of FIG. 11. In some aspects, the apparatus 1600 and/or one or more components shown in FIG. 16 may include one or more components of the UE described above in connection with FIG. 2. Additionally, or alternatively, one or more components shown in FIG. 16 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1602 may receive communications, such as reference signals, control information, data communications, or a combination thereof, from the apparatus 1606. The reception component 1602 may provide received communications to one or more other components of the apparatus 1600. In some aspects, the reception component 1602 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1606. In some aspects, the reception component 1602 may include one or more antennas, a demodulator, a MIMO detector, a receive processor, a controller/processor, a memory, or a combination thereof, of the UE described above in connection with FIG. 2.

The transmission component 1604 may transmit communications, such as reference signals, control information, data communications, or a combination thereof, to the apparatus 1606. In some aspects, one or more other components of the apparatus 1606 may generate communications and may provide the generated communications to the transmission component 1604 for transmission to the apparatus 1606. In some aspects, the transmission component 1604 may perform signal processing on the generated communications (such as filtering, amplification, modulation, digital-to-analog conversion, multiplexing, interleaving, mapping, or encoding, among other examples), and may transmit the processed signals to the apparatus 1606. In some aspects, the transmission component 1604 may include one or more antennas, a modulator, a transmit MIMO processor, a transmit processor, a controller/processor, a memory, or a combination thereof, of the UE described above in connection with FIG. 2. In some aspects, the transmission component 1604 may be co-located with the reception component 1602 in a transceiver.

The reception component 1602 may receive an indication of a polarization of at least one SSB. The determination component 1608 may determine a polarization of another beam based at least in part on the indicated polarization. In some aspects, the determination component 1608 may include a controller/processor, a memory, or a combination thereof, of the UE described above in connection with FIG. 2.

The number and arrangement of components shown in FIG. 16 are provided as an example. In practice, there may be additional components, fewer components, different components, or differently arranged components than those shown in FIG. 16. Furthermore, two or more components shown in FIG. 16 may be implemented within a single component, or a single component shown in FIG. 16 may be implemented as multiple, distributed components. Additionally, or alternatively, a set of (one or more) components shown in FIG. 16 may perform one or more functions described as being performed by another set of components shown in FIG. 16.

Figure 17:
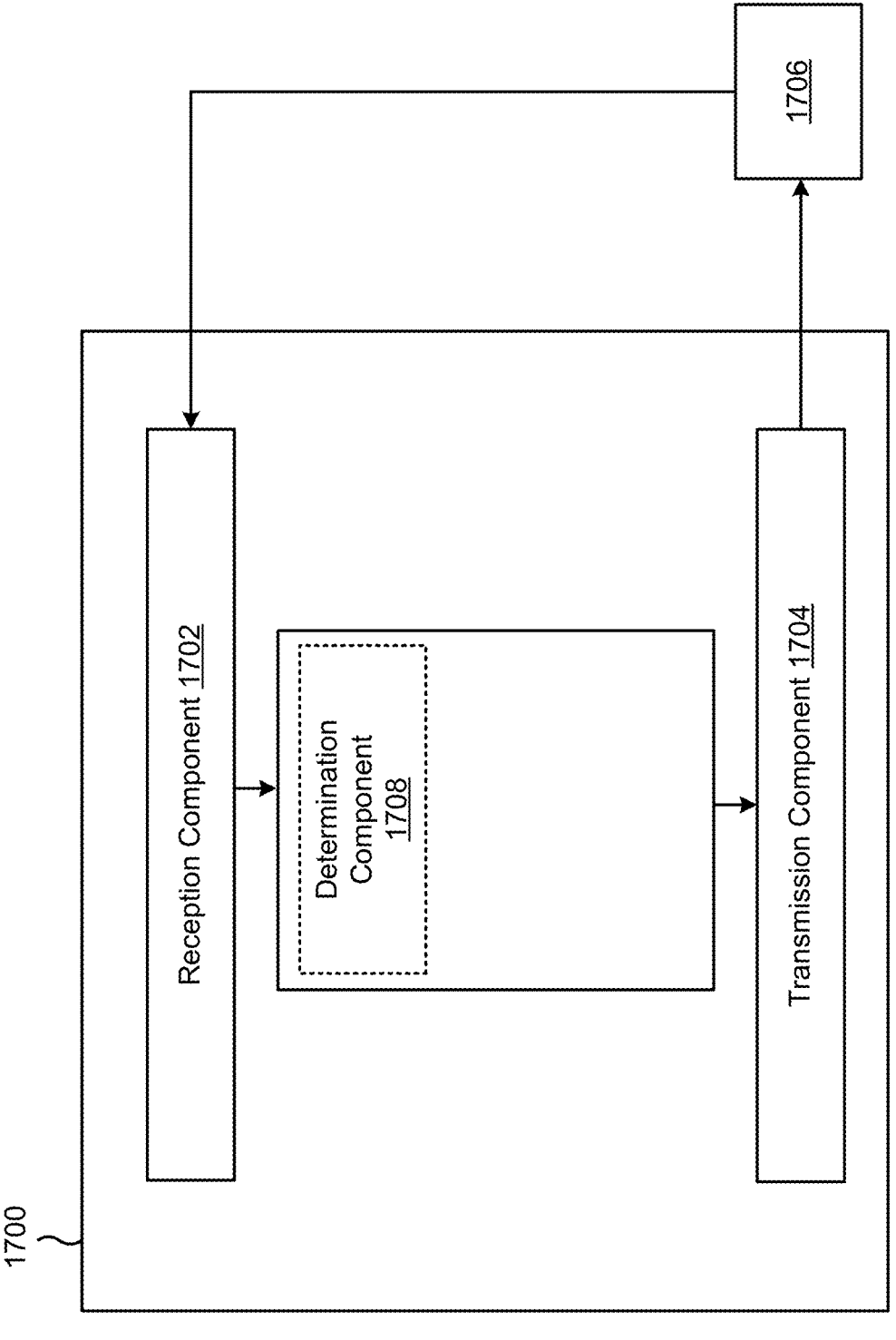

FIG. 17 is a block diagram of an example apparatus 1700 for wireless communication. The apparatus 1700 may be an NTN entity, or an NTN entity may include the apparatus 1700. In some aspects, the apparatus 1700 includes a reception component 1702 and a transmission component 1704, which may be in communication with one another (for example, via one or more buses and/or one or more other components). As shown, the apparatus 1700 may communicate with another apparatus 1706 (such as a UE, a base station, an NTN entity, or another wireless communication device) using the reception component 1702 and the transmission component 1704. As further shown, the apparatus 1700 may include a determination component 1708, among other examples.

In some aspects, the apparatus 1700 may be configured to perform one or more operations described herein in connection with FIGS. 1-10. Additionally, or alternatively, the apparatus 1700 may be configured to perform one or more processes described herein, such as process 1200 of FIG. 12. In some aspects, the apparatus 1700 and/or one or more components shown in FIG. 17 may include one or more components of the NTN entity described above in connection with FIGS. 1-3. Additionally, or alternatively, one or more components shown in FIG. 17 may be implemented within one or more components described above in connection with FIGS. 1-3. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1702 may receive communications, such as reference signals, control information, data communications, or a combination thereof, from the apparatus 1706. The reception component 1702 may provide received communications to one or more other components of the apparatus 1700. In some aspects, the reception component 1702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1706. In some aspects, the reception component 1702 may include one or more antennas, a demodulator, a MIMO detector, a receive processor, a controller/processor, a memory, or a combination thereof, of the NTN entity described above in connection with FIGS. 1-3.

The transmission component 1704 may transmit communications, such as reference signals, control information, data communications, or a combination thereof, to the apparatus 1706. In some aspects, one or more other components of the apparatus 1706 may generate communications and may provide the generated communications to the transmission component 1704 for transmission to the apparatus 1706. In some aspects, the transmission component 1704 may perform signal processing on the generated communications (such as filtering, amplification, modulation, digital-to-analog conversion, multiplexing, interleaving, mapping, or encoding, among other examples), and may transmit the processed signals to the apparatus 1706. In some aspects, the transmission component 1704 may include one or more antennas, a modulator, a transmit MIMO processor, a transmit processor, a controller/processor, a memory, or a combination thereof, of the NTN entity described above in connection with FIGS. 1-3. In some aspects, the transmission component 1704 may be collocated with the reception component 1702 in a transceiver.

The determination component 1708 may determine a polarization for an SSB and/or a CORESET #0. The determination component 1708 may determine a respective polarization for each of the one or more beam footprints. In some aspects, the determination component 1708 may include a controller/processor, a memory, or a combination thereof, of the NTN entity described above in connection with FIGS. 1-3. The transmission component 1704 may transmit an indication of a polarization of at least one SSB. The transmission component 1704 may transmit the SSB with the indicated polarization in a beam.

The number and arrangement of components shown in FIG. 17 are provided as an example. In practice, there may be additional components, fewer components, different components, or differently arranged components than those shown in FIG. 17. Furthermore, two or more components shown in FIG. 17 may be implemented within a single component, or a single component shown in FIG. 17 may be implemented as multiple, distributed components. Additionally, or alternatively, a set of (one or more) components shown in FIG. 17 may perform one or more functions described as being performed by another set of components shown in FIG. 17.

Figure 18:
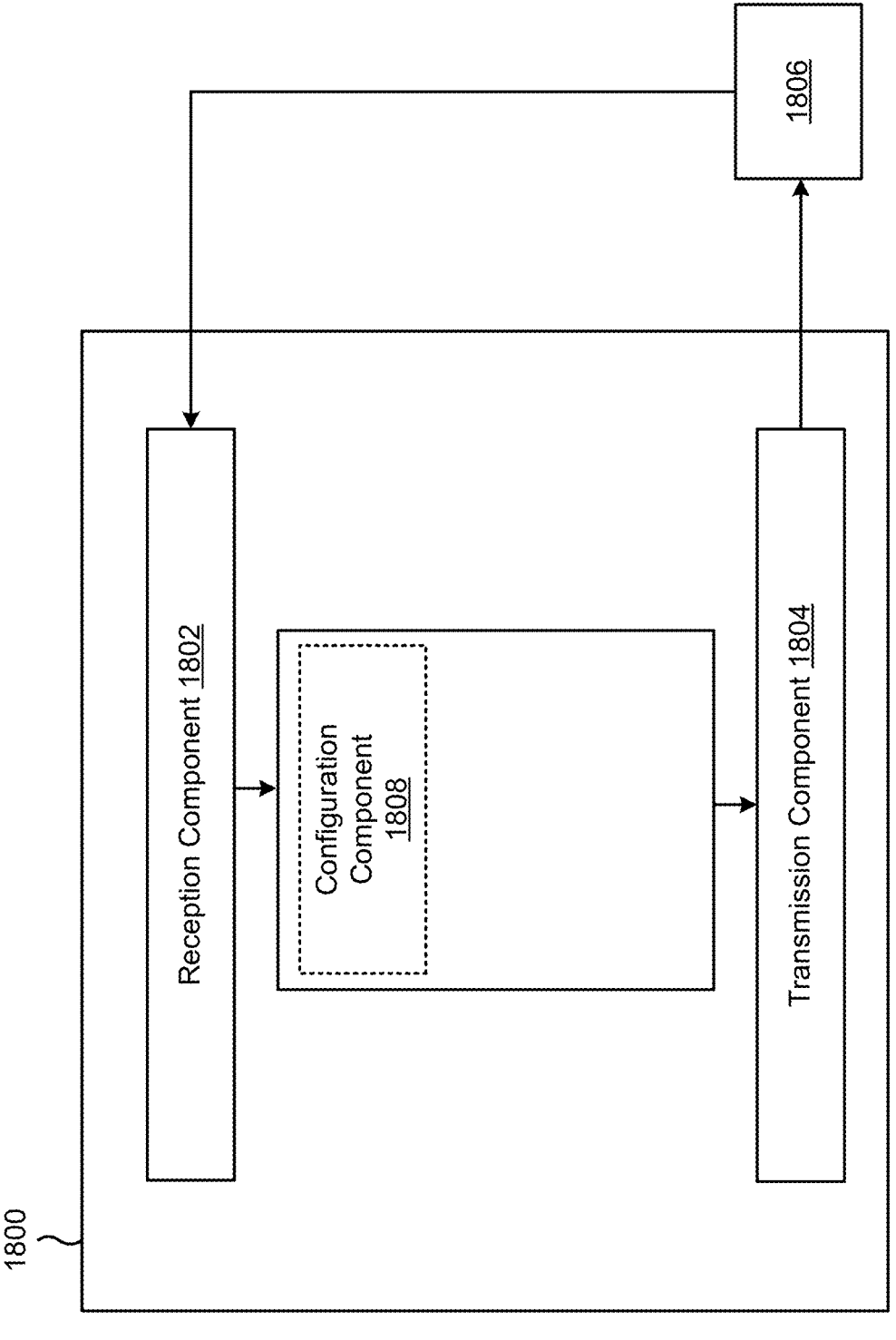

FIG. 18 is a block diagram of an example apparatus 1800 for wireless communication. The apparatus 1800 may be a UE, or a UE may include the apparatus 1800. In some aspects, the apparatus 1800 includes a reception component 1802 and a transmission component 1804, which may be in communication with one another (for example, via one or more buses and/or one or more other components). As shown, the apparatus 1800 may communicate with another apparatus 1806 (such as a UE, a base station, or another wireless communication device) using the reception component 1802 and the transmission component 1804. As further shown, the apparatus 1800 may include a configuration component 1808, among other examples.

In some aspects, the apparatus 1800 may be configured to perform one or more operations described herein in connection with FIGS. 1-10. Additionally or alternatively, the apparatus 1800 may be configured to perform one or more processes described herein, such as process 1300 of FIG. 13. In some aspects, the apparatus 1800 and/or one or more components shown in FIG. 18 may include one or more components of the UE described above in connection with FIG. 2. Additionally, or alternatively, one or more components shown in FIG. 18 may be implemented within one or more components described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1802 may receive communications, such as reference signals, control information, data communications, or a combination thereof, from the apparatus 1806. The reception component 1802 may provide received communications to one or more other components of the apparatus 1800. In some aspects, the reception component 1802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1806. In some aspects, the reception component 1802 may include one or more antennas, a demodulator, a MIMO detector, a receive processor, a controller/processor, a memory, or a combination thereof, of the UE described above in connection with FIG. 2.

The transmission component 1804 may transmit communications, such as reference signals, control information, data communications, or a combination thereof, to the apparatus 1806. In some aspects, one or more other components of the apparatus 1806 may generate communications and may provide the generated communications to the transmission component 1804 for transmission to the apparatus 1806. In some aspects, the transmission component 1804 may perform signal processing on the generated communications (such as filtering, amplification, modulation, digital-to-analog conversion, multiplexing, interleaving, mapping, or encoding, among other examples), and may transmit the processed signals to the apparatus 1806. In some aspects, the transmission component 1804 may include one or more antennas, a modulator, a transmit MIMO processor, a transmit processor, a controller/processor, a memory, or a combination thereof, of the UE described above in connection with FIG. 2. In some aspects, the transmission component 1804 may be collocated with the reception component 1802 in a transceiver.

The reception component 1802 may receive an indication of a polarization of a CORESET #0 in one of a MAC CE, an RRC message, or an MIB. The configuration component 1808 may configure one or more antennas for receiving the CORESET #0 based at least in part on the indicated polarization. In some aspects, configuration component 1808 may include one or more antennas, a demodulator, a MIMO detector, a receive processor, a modulator, a transmit MIMO processor, a transmit processor, a controller/processor, a memory, or a combination thereof, of the UE described above in connection with FIG. 2.

The number and arrangement of components shown in FIG. 18 are provided as an example. In practice, there may be additional components, fewer components, different components, or differently arranged components than those shown in FIG. 18. Furthermore, two or more components shown in FIG. 18 may be implemented within a single component, or a single component shown in FIG. 18 may be implemented as multiple, distributed components. Additionally or alternatively, a set of (one or more) components shown in FIG. 18 may perform one or more functions described as being performed by another set of components shown in FIG. 18.

Figure 19:
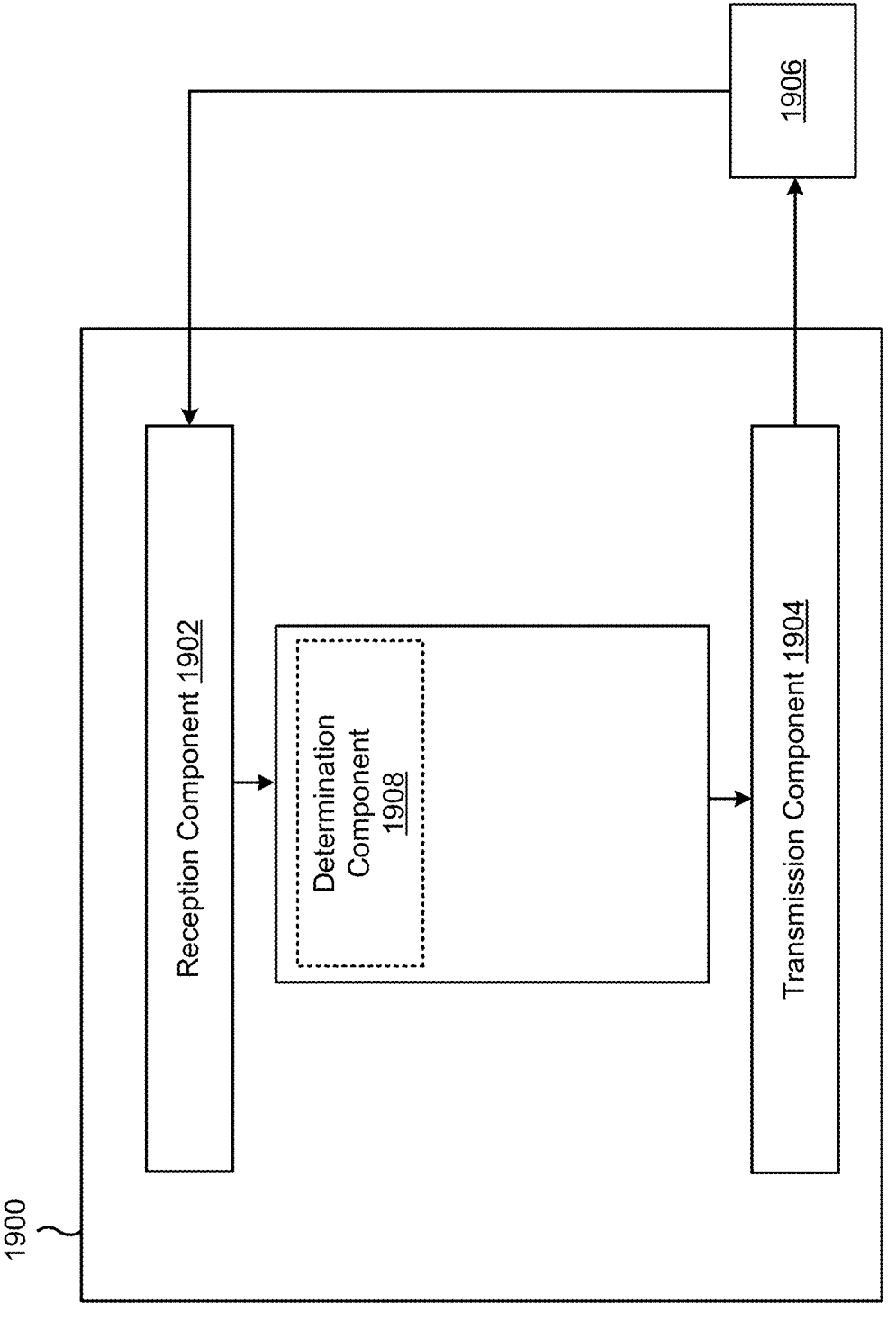

FIG. 19 is a block diagram of an example apparatus 1900 for wireless communication. The apparatus 1900 may be a UE, or a UE may include the apparatus 1900. In some aspects, the apparatus 1900 includes a reception component 1902 and a transmission component 1904, which may be in communication with one another (for example, via one or more buses and/or one or more other components). As shown, the apparatus 1900 may communicate with another apparatus 1906 (such as a UE, a base station, or another wireless communication device) using the reception component 1902 and the transmission component 1904. As further shown, the apparatus 1900 may include a determination component 1908, among other examples.

In some aspects, the apparatus 1900 may be configured to perform one or more operations described herein in connection with FIGS. 1-10. Additionally, or alternatively, the apparatus 1900 may be configured to perform one or more processes described herein, such as process 1400 of FIG. 14. In some aspects, the apparatus 1900 and/or one or more components shown in FIG. 19 may include one or more components of the UE described above in connection with FIG. 2. Additionally, or alternatively, one or more components shown in FIG. 19 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1902 may receive communications, such as reference signals, control information, data communications, or a combination thereof, from the apparatus 1906. The reception component 1902 may provide received communications to one or more other components of the apparatus 1900. In some aspects, the reception component 1902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1900. In some aspects, the reception component 1902 may include one or more antennas, a demodulator, a MIMO detector, a receive processor, a controller/processor, a memory, or a combination thereof, of the UE described above in connection with FIG. 2.

The transmission component 1904 may transmit communications, such as reference signals, control information, data communications, or a combination thereof, to the apparatus 1906. In some aspects, one or more other components of the apparatus 1900 may generate communications and may provide the generated communications to the transmission component 1904 for transmission to the apparatus 1906. In some aspects, the transmission component 1904 may perform signal processing on the generated communications (such as filtering, amplification, modulation, digital-to-analog conversion, multiplexing, interleaving, mapping, or encoding, among other examples), and may transmit the processed signals to the apparatus 1906. In some aspects, the transmission component 1904 may include one or more antennas, a modulator, a transmit MIMO processor, a transmit processor, a controller/processor, a memory, or a combination thereof, of the UE described above in connection with FIG. 2. In some aspects, the transmission component 1904 may be col-located with the reception component 1902 in a transceiver.

The reception component 1902 may receive beam footprint information for each of one or more beam footprints. The determination component 1908 may determine a respective polarization for each of the one or more beam footprints. In some aspects, the determination component 1908 may include a controller/processor, a memory, or a combination thereof, of the UE described above in connection with FIG. 2. The reception component 1902 and the transmission component 1904 may communicate in a beam footprint of the one or more beam footprints using the respective polarization determined for the beam footprint.

The number and arrangement of components shown in FIG. 19 are provided as an example. In practice, there may be additional components, fewer components, different components, or differently arranged components than those shown in FIG. 19. Furthermore, two or more components shown in FIG. 19 may be implemented within a single component, or a single component shown in FIG. 19 may be implemented as multiple, distributed components. Additionally, or alternatively, a set of (one or more) components shown in FIG. 19 may perform one or more functions described as being performed by another set of components shown in FIG. 19.

Figure 20:
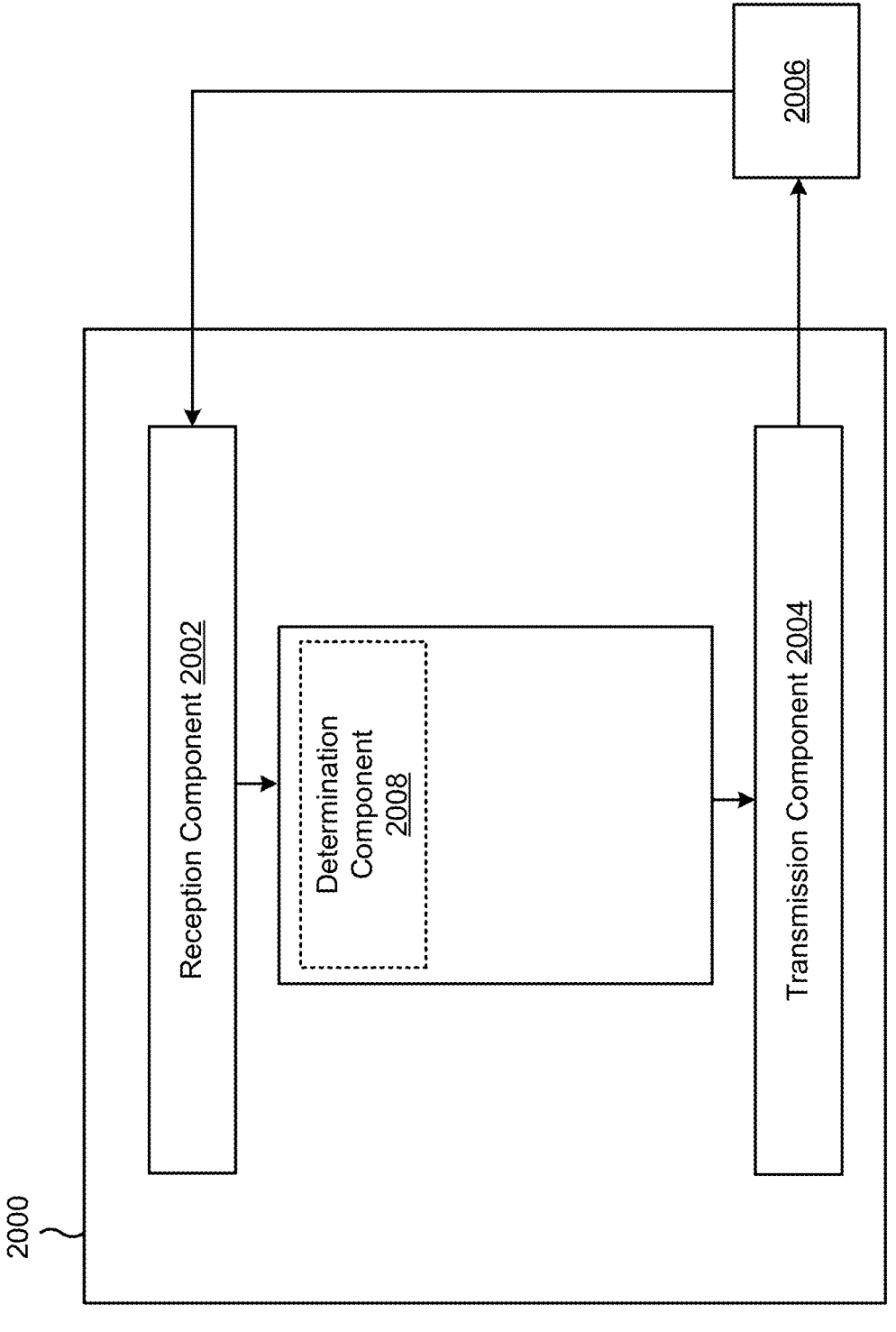

FIG. 20 is a block diagram of an example apparatus 2000 for wireless communication. The apparatus 2000 may be an NTN entity, or an NTN entity may include the apparatus 2000. In some aspects, the apparatus 2000 includes a reception component 2002 and a transmission component 2004, which may be in communication with one another (for example, via one or more buses and/or one or more other components). As shown, the apparatus 2000 may communicate with another apparatus 2006 (such as a UE, a base station, or another wireless communication device) using the reception component 2002 and the transmission component 2004. As further shown, the apparatus 2000 may include a determination component 2008, among other examples.

In some aspects, the apparatus 2000 may be configured to perform one or more operations described herein in connection with FIGS. 1-10. Additionally, or alternatively, the apparatus 2000 may be configured to perform one or more processes described herein, such as process 1500 of FIG. 15. In some aspects, the apparatus 2000 and/or one or more components shown in FIG. 20 may include one or more components of the NTN entity described above in connection with FIGS. 1-3. Additionally, or alternatively, one or more components shown in FIG. 20 may be implemented within one or more components described above in connection with FIGS. 1-3. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 2002 may receive communications, such as reference signals, control information, data communications, or a combination thereof, from the apparatus 2006. The reception component 2002 may provide received communications to one or more other components of the apparatus 2000. In some aspects, the reception component 2002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 2000. In some aspects, the reception component 2002 may include one or more antennas, a demodulator, a MIMO detector, a receive processor, a controller/processor, a memory, or a combination thereof, of the NTN entity described above in connection with FIGS. 1-3.

The transmission component 2004 may transmit communications, such as reference signals, control information, data communications, or a combination thereof, to the apparatus 2006. In some aspects, one or more other components of the apparatus 2000 may generate communications and may provide the generated communications to the transmission component 2004 for transmission to the apparatus 2006. In some aspects, the transmission component 2004 may perform signal processing on the generated communications (such as filtering, amplification, modulation, digital-to-analog conversion, multiplexing, interleaving, mapping, or encoding, among other examples), and may transmit the processed signals to the apparatus 2006. In some aspects, the transmission component 2004 may include one or more antennas, a modulator, a transmit MIMO processor, a transmit processor, a controller/processor, a memory, or a combination thereof, of the NTN entity described above in connection with FIGS. 1-3. In some aspects, the transmission component 2004 may be collocated with the reception component 2002 in a transceiver.

The determination component 2008 may determine beam footprint information. In some aspects, the determination component 2008 may include one or more antennas, a demodulator, a MIMO detector, a receive processor, a controller/processor, a memory, or a combination thereof, of the NTN entity described above in connection with FIGS. 1-3.

The transmission component 2004 may transmit beam footprint information for each of one or more beam footprints, the beam footprint information indicating a respective polarization for each of the one or more beam footprints. The reception component 2002 and the transmission component 2004.

The number and arrangement of components shown in FIG. 20 are provided as an example. In practice, there may be additional components, fewer components, different components, or differently arranged components than those shown in FIG. 20. Furthermore, two or more components shown in FIG. 20 may be implemented within a single component, or a single component shown in FIG. 20 may be implemented as multiple, distributed components. Additionally, or alternatively, a set of (one or more) components shown in FIG. 20 may perform one or more functions described as being performed by another set of components shown in FIG. 20.

The following provides an overview of some Aspects of the present disclosure:

Aspect 1: A method of wireless communication performed by a user equipment (UE), comprising: receiving an indication of a polarization of at least one synchronization signal block (SSB); and determining a polarization of another beam based at least in part on the indicated polarization.

Aspect 2: The method of Aspect 1, further comprising receiving the indication in a system information block.

Aspect 3: The method of Aspect 2, wherein the indication associates a polarization with each beam of one or more beams, and wherein each beam is identified by one or more of a synchronization signal block index, a satellite beam index, a physical cell identity, or a satellite index.

Aspect 4: The method of any of Aspects 1-3, further comprising receiving at least one SSB in a beam with the indicated polarization, wherein receiving the indication includes receiving the indication on a physical broadcast channel.

Aspect 5: The method of Aspect 4, wherein receiving the indication comprises receiving the indication in a master information block.

Aspect 6: The method of Aspect 5, wherein the master information block indicates a polarization of a control resource set zero.

Aspect 7: The method of Aspect 4, wherein the indication is encoded with scrambling sequences for bits of the physical broadcast channel.

Aspect 8: The method of Aspect 4, wherein the indication is a demodulation reference signal sequence for the physical broadcast channel.

Aspect 9: The method of any of Aspects 1-8, wherein the indication indicates a polarization from among polarizations that are orthogonal to one another.

Aspect 10: The method of any of Aspects 1-9, further comprising: determining an interpretation of the indicated polarization based at least in part on a receive antenna polarization; and communicating using an antenna configuration that is based at least in part on the interpretation.

Aspect 11: The method of Aspect 10, further comprising: measuring a quality of a communication for each of a plurality of receive antenna polarizations; and associating a receive antenna polarization with the indicated polarization based at least in part on quality measurements for the plurality of receive antenna polarizations.

Aspect 12: The method of any of Aspects 1-11, further comprising receiving at least one SSB in a beam with the indicated polarization, and wherein the at least one SSB indicates a polarization for each of one or more control resource sets zero.

Aspect 13: The method of any of Aspects 1-12, further comprising determining a polarization of a control resource set zero to be a same polarization as the SSB.

Aspect 14: The method of any of Aspects 1-13, further comprising receiving an indication of a polarization of an initial downlink bandwidth part and a polarization of an initial uplink bandwidth part in a system information block 1 (SIB1).

Aspect 15: The method of any of Aspects 1-14, further comprising: receiving an indication of a polarization of a control resource set zero (CORESET #0); and determining an indication of a polarization of an initial downlink bandwidth part and a polarization of an initial uplink bandwidth part based at least in part on one or more of the polarization of the CORESET #0 or the polarization of the at least one SSB.

Aspect 16: The method of any of Aspects 1-15, further comprising: receiving, in system information, an indication of an SSB pattern of one or more of a time resource, a frequency resource, or a polarization; and monitoring for SSBs, SSB pairs, or SSB bursts based at least in part on the SSB pattern.

Aspect 17: The method of Aspect 16, wherein each SSB pair of the SSB pairs includes an SSB with a first polarization and an SSB with a second polarization.

Aspect 18: The method of Aspect 16, wherein the SSBs, SSB pairs, or SSB bursts have a specified polarization.

Aspect 19: The method of Aspect 16, wherein the SSB bursts have alternating polarizations.

Aspect 20: A method of wireless communication performed by a non-terrestrial network entity, comprising: transmitting an indication of a polarization of at least one synchronization signal block (SSB); and transmitting the SSB with the indicated polarization in a beam.

Aspect 21: The method of Aspect 20, wherein transmitting the indication includes transmitting the indication in a system information block.

Aspect 22: The method of Aspect 20, wherein transmitting the indication includes transmitting the indication on a physical broadcast channel.

Aspect 23: The method of Aspect 20, wherein the SSB indicates a polarization for each of one or more control resource sets zero.

Aspect 24: The method of any of Aspects 20-23, further comprising transmitting an indication of a polarization of a control resource set zero in a medium access control control element (MAC CE) or a radio resource control message.

Aspect 25: The method of any of Aspects 20-24, further comprising transmitting an indication of a polarization of an initial downlink bandwidth part and a polarization of an initial uplink bandwidth part in a system information block 1 (SIB1).

Aspect 26: The method of any of Aspects 20-25, further comprising: transmitting, in system information, an indication of an SSB pattern of one or more of time, frequency, or polarization; and transmitting SSBs, SSB pairs, or SSB bursts based at least in part on the SSB pattern.

Aspect 27: A method of wireless communication performed by a user equipment (UE), comprising: receiving an indication of a polarization of a control resource set zero (CORESET #0) in one of a medium access control control element (MAC CE), a radio resource control message, or a master information block; and configuring one or more antennas for receiving the CORESET #0 based at least in part on the indicated polarization.

Aspect 28: The method of Aspect 27, wherein the indication of the polarization of the CORESET #0 specifies the polarization of the CORESET #0.

Aspect 29: The method of Aspect 27 or 28, wherein the indication of the polarization of the CORESET #0 includes one or more transmission configuration indicator (TCI) states that indicate a quasi-colocation (QCL) type, and wherein the method further comprises determining the polarization of the CORESET #0 based at least in part on the one or more TCI states.

Aspect 30: A method of wireless communication performed by a user equipment (UE), comprising: receiving beam footprint information for each of one or more beam footprints; determining a respective polarization for each of the one or more beam footprints; and communicating in a beam footprint of the one or more beam footprints using the respective polarization determined for the beam footprint.

Aspect 31: The method of Aspect 30, wherein determining the respective polarization includes determining the respective polarization from an indication of the polarization in the beam footprint information.

Aspect 32: The method of Aspect 30 or 31, wherein determining the respective polarization includes determining the respective polarization based at least in part on the beam footprint information and a reference polarization.

Aspect 33: The method of any of Aspects 30-32, wherein the beam footprint is for a beam associated with one or more of a synchronization signal block, a control resource set zero, an initial downlink bandwidth part, or a physical cell identity.

Aspect 34: The method of any of Aspects 30-33, further comprising determining the beam footprint from one or more of a beam center, a beam shape, a beam size, a beam orientation, beam coordinates, an antenna tilt angle of a non-terrestrial network entity, or an orbit of a non-terrestrial network entity.

Aspect 35: The method of any of Aspects 30-34, wherein receiving the beam footprint information includes receiving the beam footprint information in a system information block.

Aspect 36: A method of wireless communication performed by a non-terrestrial network entity, comprising: transmitting beam footprint information for each of one or more beam footprints, the beam footprint information indicating a respective polarization for each of the one or more beam footprints; and communicating in a beam footprint of the one or more beam footprints using the respective polarization for the beam footprint.

Aspect 37: The method of Aspect 36, wherein the beam footprint is for a beam associated with one or more of a synchronization signal block, a control resource set zero, an initial downlink bandwidth part, or a physical cell identity.

Aspect 38: An apparatus for wireless communication at a device, comprising a processor; memory coupled with the processor; and instructions stored in the memory and executable by the processor to cause the apparatus to perform the method of one or more of Aspects 1-37.

Aspect 39: A device for wireless communication, comprising a memory and one or more processors coupled to the memory, the one or more processors configured to perform the method of one or more of Aspects 1-37.

Aspect 40: An apparatus for wireless communication, comprising at least one means for performing the method of one or more of Aspects 1-37.

Aspect 41: A non-transitory computer-readable medium storing code for wireless communication, the code comprising instructions executable by a processor to perform the method of one or more of Aspects 1-37.

Aspect 42: A non-transitory computer-readable medium storing a set of instructions for wireless communication, the set of instructions comprising one or more instructions that, when executed by one or more processors of a device, cause the device to perform the method of one or more of Aspects 1-37.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware, firmware, and/or a combination of hardware and software.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, a combination of related and unrelated items), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), comprising:
   one or more memories; and
   one or more processors coupled to the one or more memories, which are configured, individually or in any combination, to:
   receive, on a physical broadcast channel, a master information block comprising an indication of a polarization of at least one synchronization signal block (SSB), wherein the polarization is a circular or linear polarization, and wherein the indication of the polarization is encoded with a scrambling sequence for bits of the physical broadcast channel;
   receive the at least one SSB in a first beam with the indicated polarization; and
   communicate using an antenna configuration that is based at least in part on the at least one SSB and the indicated polarization, wherein, in communicating using the antenna configuration, the one or more processors are configured to measure a quality of a communication for each of a plurality of receive antenna polarizations and associate a receive antenna polarization with the indicated polarization based at least in part on quality measurements for the plurality of receive antenna polarizations.

2. The apparatus of claim 1, wherein the indication associates a polarization with each beam of one or more beams, and wherein each beam is identified by one or more of an SSB index or a physical cell identity.

3. The apparatus of claim 1, wherein the master information block indicates a polarization of a control resource set zero.

4. The apparatus of claim 1, wherein the indication is a demodulation reference signal sequence for the physical broadcast channel.

5. The apparatus of claim 1, wherein the indication indicates a polarization from among polarizations that are orthogonal to one another.

6. The apparatus of claim 1, wherein the one or more processors are configured to:
determine an interpretation of the indicated polarization based at least in part on a receive antenna polarization.

7. The apparatus of claim 1, wherein the at least one SSB indicates a polarization for each of one or more control resource sets zero.

8. The apparatus of claim 1, wherein the one or more processors are configured to determine a polarization of a control resource set zero to be a same polarization as the at least one SSB.

9. The apparatus of claim 1, wherein the one or more processors are configured to receive an indication of a polarization of an initial downlink bandwidth part and a polarization of an initial uplink bandwidth part in a system information block 1 (SIB1).

10. The apparatus of claim 1, wherein the one or more processors are configured to:
receive an indication of a polarization of a control resource set zero (CORESET #0); and
determine an indication of a polarization of a downlink bandwidth part and a polarization of an uplink bandwidth part based at least in part on one or more of the polarization of the CORESET #0 or the polarization of the at least one SSB.

11. The apparatus of claim 1, wherein the one or more processors are configured to:
receive, in system information, an indication of an SSB pattern of one or more of a time resource, a frequency resource, or a polarization; and
monitor for SSBs, SSB pairs, or SSB bursts based at least in part on the SSB pattern.

12. The apparatus of claim 11, wherein each SSB pair of the SSB pairs includes an SSB with a first polarization and an SSB with a second polarization.

13. The apparatus of claim 11, wherein the SSBs, SSB pairs, or SSB bursts have a specified polarization.

14. The apparatus of claim 11, wherein the SSB bursts have alternating polarizations.

15. An apparatus for wireless communication at a non-terrestrial network entity, comprising:
one or more memories; and
one or more processors coupled to the one or more memories, which are configured, individually or in any combination, to:

select a scrambling sequence for bits of a physical broadcast channel (PBCH);
encode an indication of a polarization of at least one synchronization signal block (SSB) with the scrambling sequence, wherein the polarization is a circular or linear polarization;
transmit, on the PBCH, the indication of the polarization; and
transmit the at least one SSB, for which the polarization is indicated, with the indicated polarization in a beam, wherein the indicated polarization is selected based at least in part on quality measurements of a communication using a plurality of receive antenna polarizations.

16. The apparatus of claim 15, wherein the SSB indicates a polarization for each of one or more control resource sets zero.

17. The apparatus of claim 15, wherein the one or more processors are configured to transmit an indication of a polarization of a control resource set zero in a medium access control element (MAC CE) or a radio resource control message.

18. The apparatus of claim 15, wherein the one or more processors are configured to transmit, in a system information block 1 (SIB1), an indication of a polarization of an initial downlink bandwidth part and a polarization of an initial uplink bandwidth part.

19. An apparatus for wireless communication at a user equipment (UE), comprising:
one or more memories; and
one or more processors coupled to the one or more memories, which are configured, individually or in any combination, to:
receive an indication of a polarization of a bandwidth part in a system information block, wherein the polarization of the bandwidth part is relative to a polarization of a reference signal;
receive an indication of a polarization of a control resource set zero (CORESET #0) in one of a medium access control element (MAC CE) or a radio resource control message, wherein the polarization of the CORESET #0 is relative to the polarization of the reference signal; and
configure one or more antennas for receiving the CORESET #0 based at least in part on the polarization of the CORESET #0, wherein a configuration of the one or more antennas is selected based at least in part on quality measurements of communications using a plurality of receive antenna polarizations and is associated with the indicated polarization.

20. The apparatus of claim 19, wherein the indication of the polarization of the CORESET #0 specifies the polarization of the CORESET #0.

21. The apparatus of claim 19, wherein the indication of the polarization of the CORESET #0 includes one or more transmission configuration indicator (TCI) states that indicate a quasi-colocation (QCL) type, and wherein the one or more processors are configured to determine the polarization of the CORESET #0 based at least in part on the one or more TCI states.

22. The apparatus of claim 19, wherein configuring the one or more antennas comprises selecting, based at least in part on quality measurements of communications using a plurality of receive antenna polarizations, a receive antenna polarization to be used for receiving the CORESET #0.

23. A method of wireless communication performed by a user equipment (UE), comprising:

receiving, on a physical broadcast channel, a master information block comprising an indication of a polarization of at least one synchronization signal block (SSB), wherein the polarization is a circular or linear polarization, and wherein the indication of the polarization is encoded with a scrambling sequence for bits of the physical broadcast channel;

receiving the at least one SSB in a first beam with the indicated polarization; and communicating using an antenna configuration that is based at least in part on the at least one SSB and the indicated polarization, wherein the antenna configuration is selected based at least in part on quality measurements of a communication using a plurality of receive antenna polarizations and is associated with the indicated polarization.

24. The method of claim 23, wherein the indication associates a polarization with each beam of one or more beams, and wherein each beam is identified by one or more of an SSB index or a physical cell identity.

25. The method of claim 23, wherein the master information block indicates a polarization of a control resource set zero.

26. The method of claim 23, wherein the indication is a demodulation reference signal sequence for the physical broadcast channel.

27. The method of claim 23, wherein the indication indicates a polarization from among polarizations that are orthogonal to one another.

28. The method of claim 23, wherein the at least one SSB indicates a polarization for each of one or more control resource sets zero.

29. The method of claim 23, wherein the antenna configuration is selected based at least in part on the at least one SSB and the quality measurements.

30. The method of claim 23, wherein the antenna configuration is based at least in part on at least one receive antenna polarization.

* * * * *